United States Patent [19]

Yoshida et al.

[11] 4,139,871
[45] Feb. 13, 1979

[54] EIGHT-HEAD MAGNETIC VIDEO TAPE RECORDING AND REPRODUCING APPARATUS WITH ROTARY TRANSFORMER

[75] Inventors: Takeshi Yoshida, Sagamihara; Yukio Kameyama, Hino; Hitoshi Masuko, Sagamihara; Keiichi Yaguchi, Tokyo, all of Japan

[73] Assignee: Nippon Hōsō Kyōkai, Tokyo, Japan

[21] Appl. No.: 634,910

[22] Filed: Nov. 24, 1975

[51] Int. Cl.$^2$ .................. H04N 5/785; G11B 21/06
[52] U.S. Cl. ........................... 360/64; 360/70; 360/84; 360/108
[58] Field of Search ............ 360/64, 84, 70, 33, 360/107, 108; 178/6.6 HS, 6.6 P

[56] References Cited

U.S. PATENT DOCUMENTS

| | | | |
|---|---|---|---|
| 2,750,449 | 6/1956 | Thompson et al. | 360/84 |
| 2,860,191 | 11/1958 | Runge | 360/84 |
| 2,866,012 | 12/1958 | Ginsburg et al. | 360/84 |
| 3,099,709 | 7/1963 | Barry | 360/64 |
| 3,278,678 | 10/1966 | Rank | 360/84 |
| 3,333,063 | 7/1967 | Stratton | 360/64 |
| 3,487,374 | 12/1969 | Droux | 360/84 |
| 3,536,856 | 10/1970 | Kietz et al. | 360/84 |
| 3,911,486 | 10/1975 | Hibbard | 360/64 |

OTHER PUBLICATIONS

Kybett, Video Tape Recorders, 1974, p. 150.

*Primary Examiner*—Raymond F. Cardillo, Jr.

*Attorney, Agent, or Firm*—Stevens, Davis, Miller & Mosher

[57] ABSTRACT

In a magnetic video tape recording and reproducing apparatus (VTR) having rotary magnetic video heads rotating in a direction substantially perpendicular to the direction of tape travel, the width of the magnetic tape is reduced substantially to one inch from the conventional two inches, and eight video heads for recording a video signal on the magnetic tape and for reproducing the video signal from the magnetic tape are mounted on the circumferential surface of a rotary head drum having a diameter substantially equal to two inches and are arranged to be equidistant from one another in the direction of circumference of the rotary head drum. According to this invention, a compact VTR can be realized. In addition, the video signal may be transferred to and from the rotary head drum alternately through one of two circuit paths composed of a signal coupling means and an input/output circuit respectively, in order to realize a more compact, light weight and low power consumption VTR. Further, in order to improve the tape tracking accuracy in the case of such a narrow-width video head, use is made of a control signal whose n cycles of pulses in a pulse series obtained from a drum tachometer pulse are eliminated when a frame reference signal occurs so as to multiplex the pulse series with the frame reference signal. A control signal track is disposed at or around the minimum stretch portion or the center of the magnetic tape in the direction of the tape travel, and the tape travel is controlled by integral, differential, local proportional and proportional control systems, so as to further improve tape tracking accuracy.

12 Claims, 35 Drawing Figures

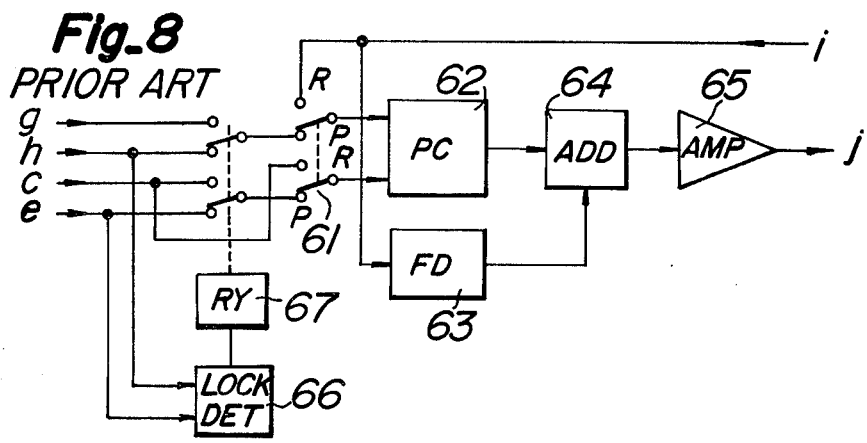
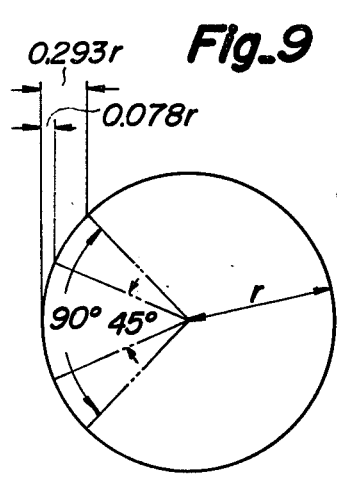
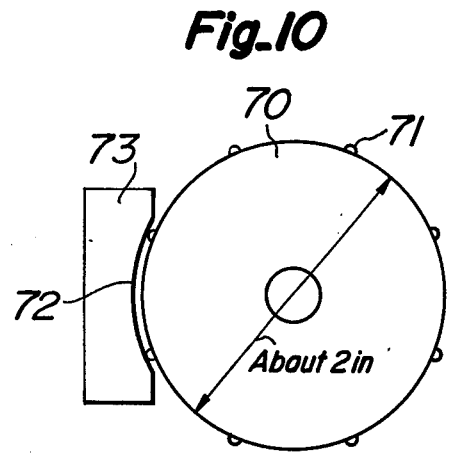
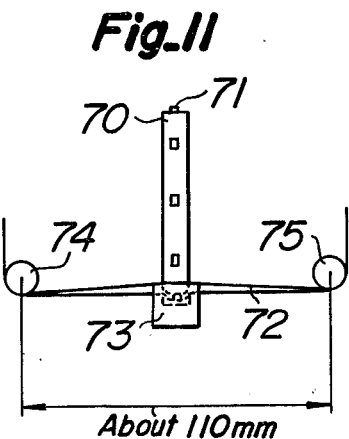
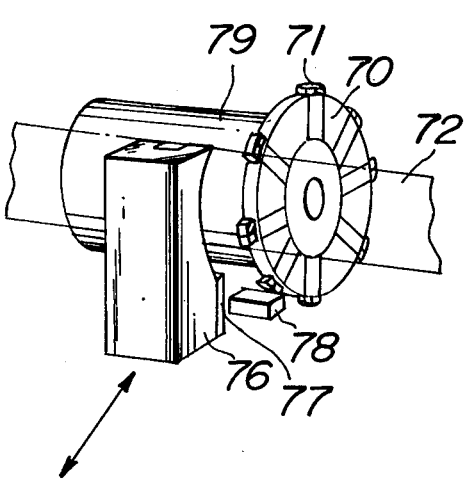

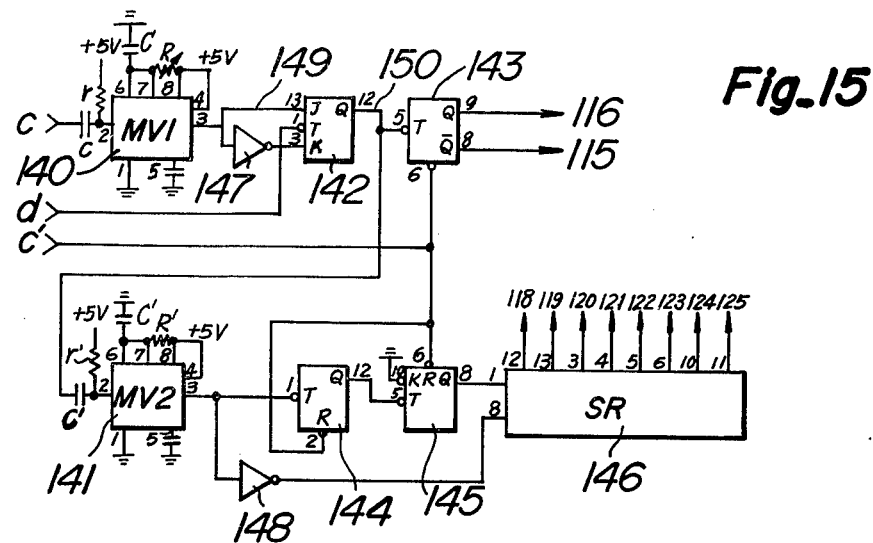
Fig._15
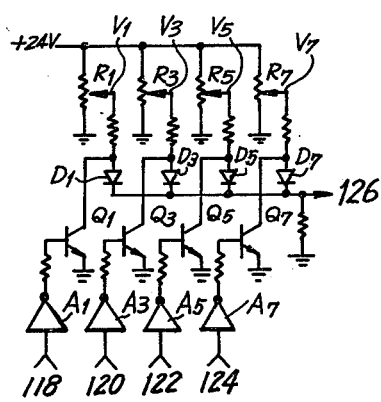
Fig._17
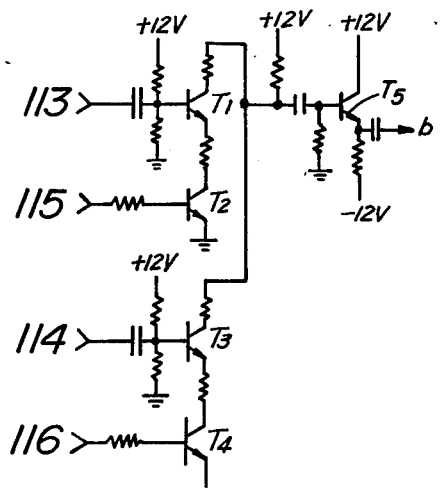
Fig._18
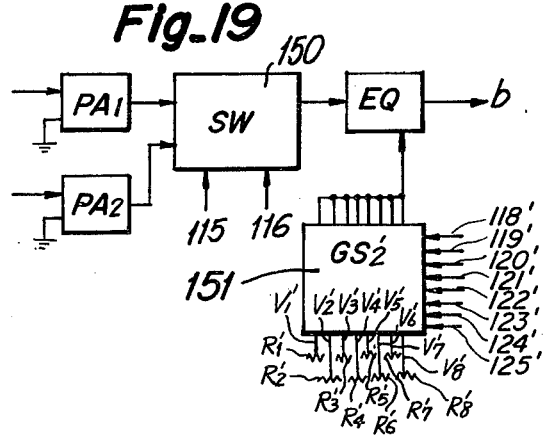
Fig._19
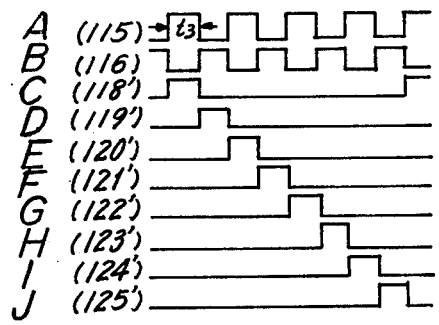
Fig._20

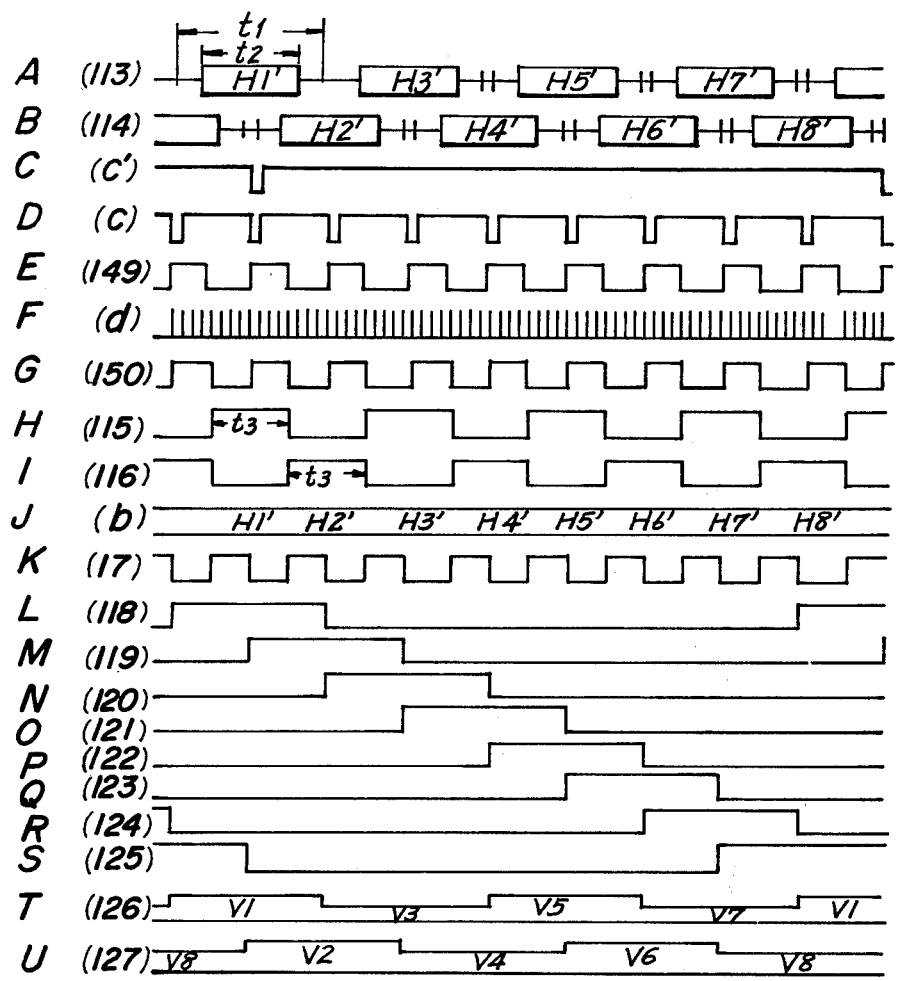

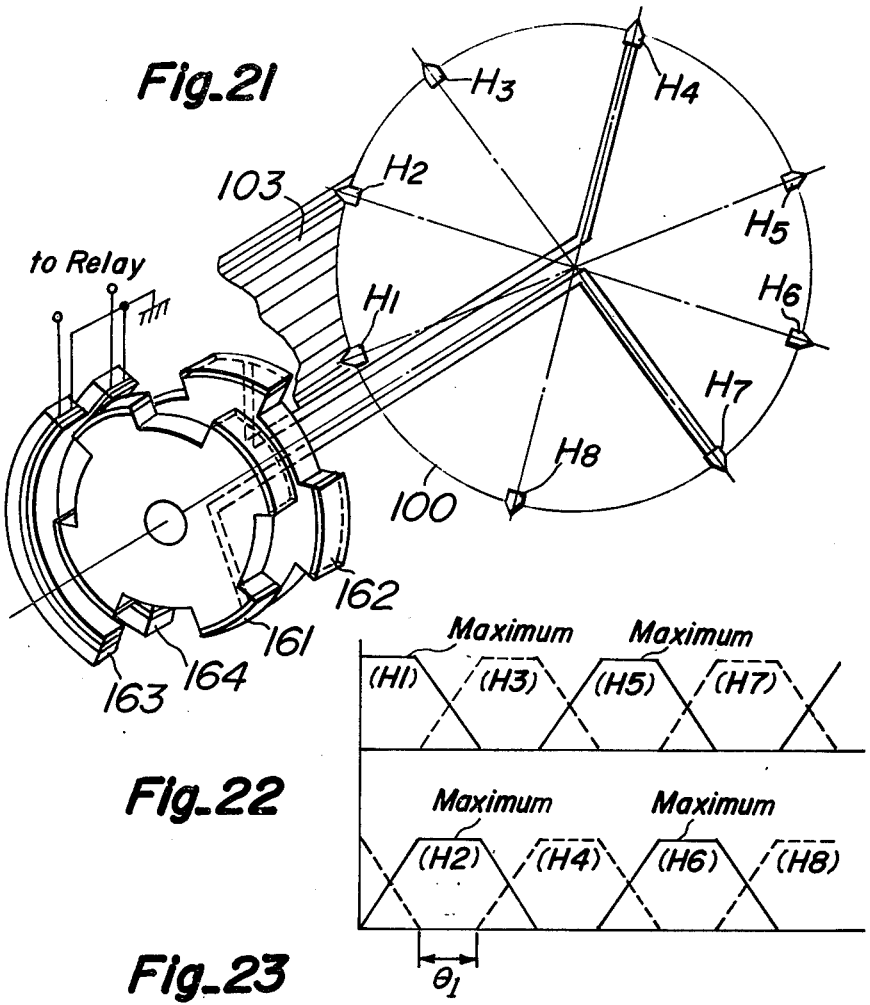
Fig.21
Fig.22
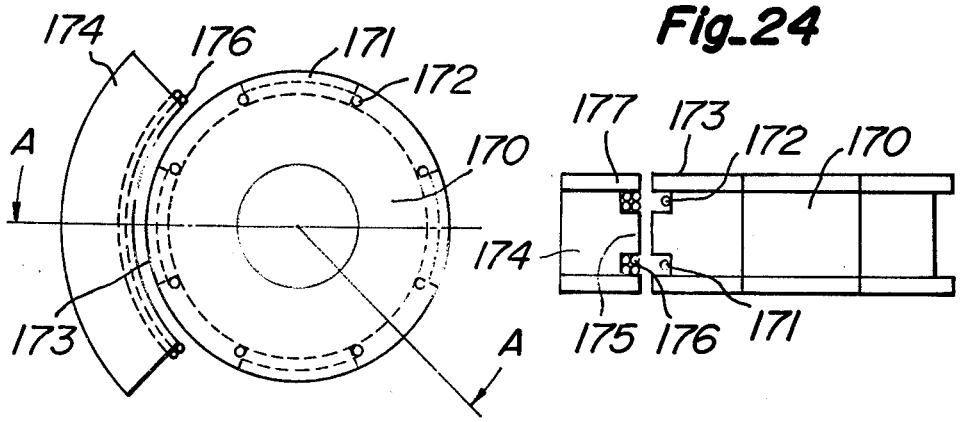
Fig.23
Fig.24

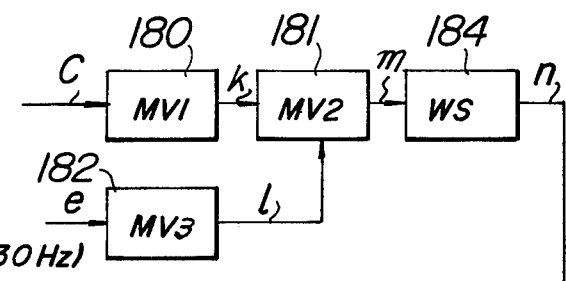
Fig.25
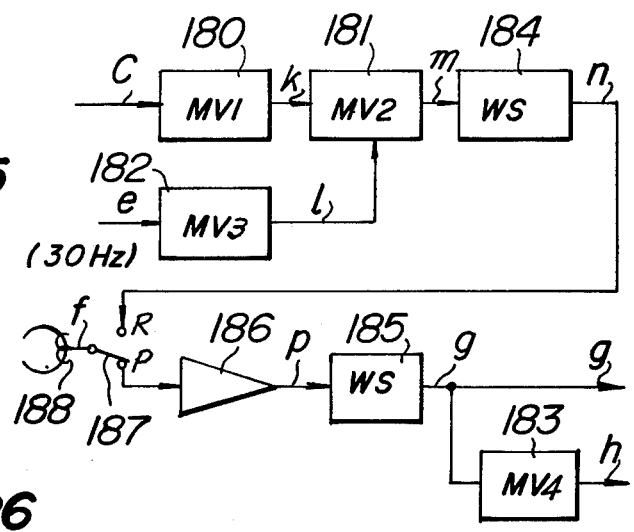
Fig.26
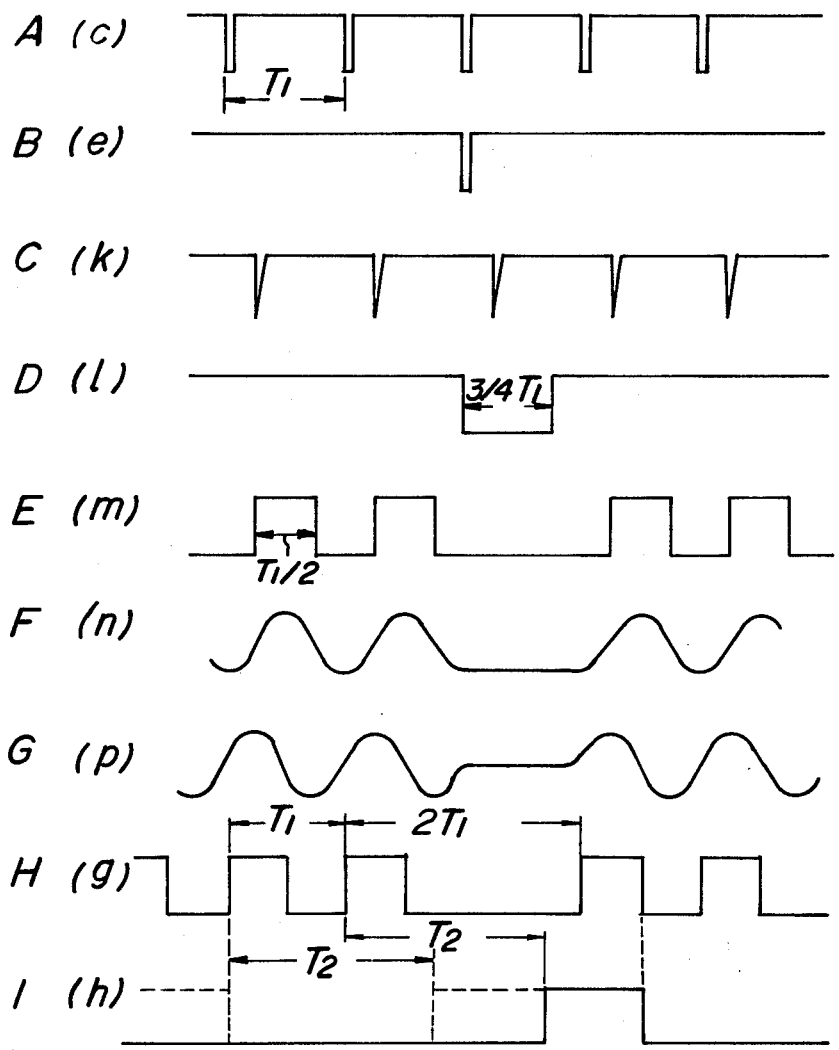

Fig_27
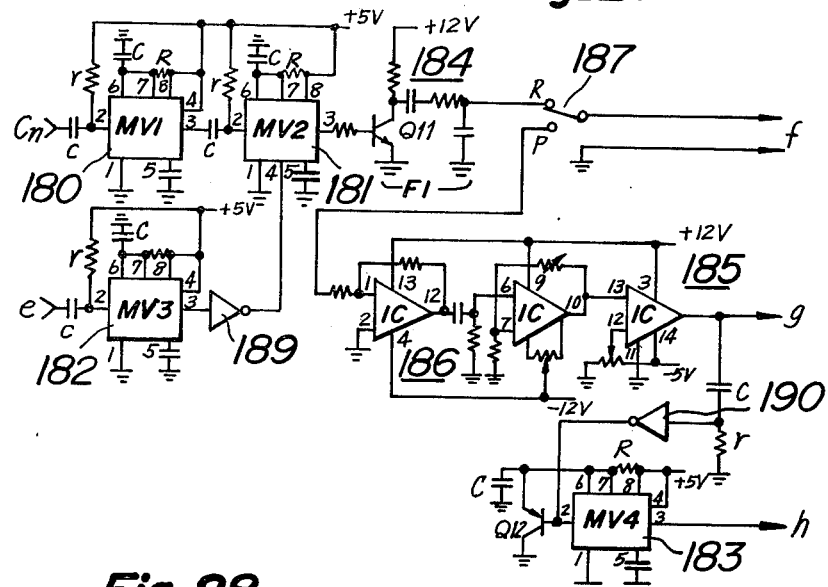
Fig_28
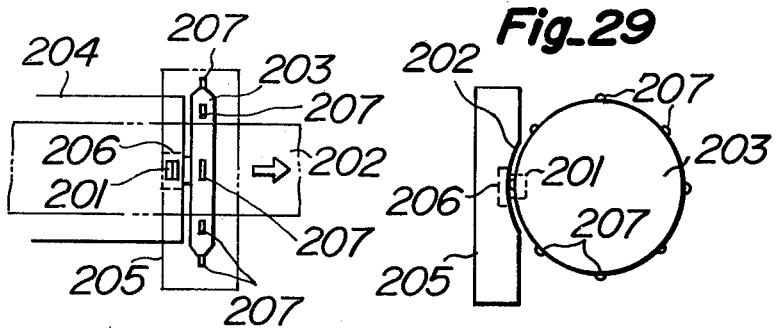
Fig_29
Fig_30
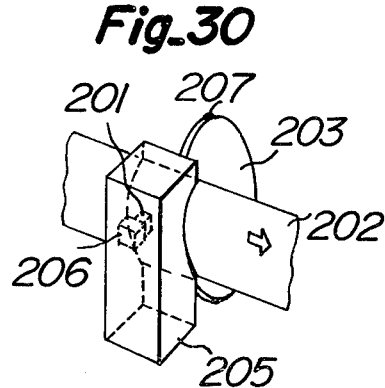
Fig_31
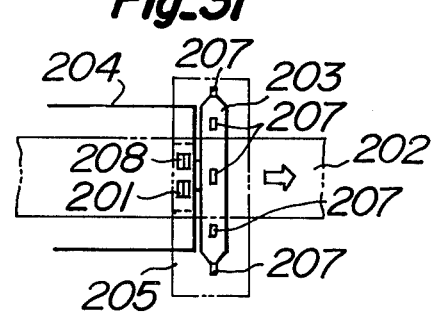

EIGHT-HEAD MAGNETIC VIDEO TAPE RECORDING AND REPRODUCING APPARATUS WITH ROTARY TRANSFORMER

BACKGROUND OF THE INVENTION

The present invention relates to a magnetic video tape recording and reproducing apparatus having rotary heads. In particular, it relates to a so-called traverse scanning type video tape recorder which has a plurality of magnetic video heads rotating in a direction substantially perpendicular to the direction of tape travel and in which a magnetic tape is scanned in a direction perpendicular to the direction of tape motion by the rotary heads so as to record or reproduce signals.

Hitherto, magnetic video recording and reproducing apparatus having four rotary video heads or helical scanning type magnetic video recording and reproducing apparatus having two rotary video heads have been employed for broadcasting, industrial or domestic use.

Recently, these magnetic video tape recording and reproducing apparatus, i.e. VTR have become compact. For instance, the smallest broadcasting use VTR having four heads weighs about 24 Kg, and the smallest oblique scanning type VTR weighs about 18-25 Kg. In the two-head helical scanning type VTR, the relative speed between tape and head is determined to be around 10 m/sec, since the signal within one field of the standard television signal is recorded on one track and the size of the apparatus is limited. Accordingly, recording of the high frequency components of a television signal is insufficient. Especially, in the case of a color television signal, the VTR of this kind is not suitable for broadcasting use. In addition, this VTR has such disadvantages as large jitter and difficulty in splice editing of recorded magnetic tape. In comparison with the two-head VTR, the four-head VTR of the type mentioned above does not have the disadvantages of the two-head VTR. It is, however, difficult to make the four-head VTR more compact, because the tape path requires a comparatively long canoe area in which the tape is gradually curved to hold the same to a female guide, and in the case of the usual tape having a tape width of 2 inches, the canoe area should be sufficiently long. When high density recording is desired and the recording video track width is set at a quarter of the normal width, the use of the normal tape having a tape width of 2 inches results in a decrease of the tape travelling speed to a quarter of the normal speed, and therefore the recording and reproducing characteristics of the audio signal is largely deteriorated.

The conventional VTR, which has rotary heads to record and reproduce a video signal, has rotary transformers. In this case, it is necessary to provide the same number of rotary transformers, recording amplifiers, reproducing pre-amplifiers and equalizers as the number of rotary heads, so that the increase in the number of rotary heads makes it difficult to realize a more compact, lighter and low power consumption VTR.

In the conventional VTR, a sinusoidal wave signal (240 Hz in the case of the four-head VTR) which is required to improve the tape tracking accuracy of the rotary head during the reproducing or playback mode is combined with a frame sync signal (30 Hz) in a form of a pulse for phase locking the reproduced picture with an external sync signal so as to produce a control signal which is recorded on the magnetic tape. In the reproducing mode, both the sinusoidal wave signal and the frame sync signal are separated from the reproduced signal. In this case, these signals are separated by a band pass filter in the reproducing mode, so that the band width of a tape travelling servo loop including the band pass filter becomes narrow and at the same time the phase characteristics in the higher frequency range are deteriorated. Therefore, it is difficult to increase the loop gain, so that the tape travelling jitter cannot be sufficiently suppressed and an increase in the tracking accuracy cannot be expected. In addition, in order to realize a high density magnetic record by means of narrow-width video heads, it is necessary to improve the tracking accuracy by increasing the frequency of the control signal almost up to the critical frequency of recording. The conventional multi-recording in the above mentioned pulse form does not satisfy this requirement, and it has been desired to develop a new multi-recording system.

Further, the conventional VTR has a control signal track at the side end portion of the magnetic tape. In this case, this tape portion is more expansible than the center portion. The tape is curved to fit a circular path of the video head so that the tape is apt to change its shape. Therefore, the relative phase between the control track and the video track is varied, and the reproducing level of the control signal is varied, so that tracking error occurs. The thinner the tape and the shorter the recording wavelength of the control signal on the control track, the more sufficient the above influences become. Therefore, these influences are an obstacle to the realization of high density recording by utilizing a thin tape and narrow width track.

There is also a further disadvantage in the prior conventional VTR. in that, the capstan servo system for controlling tape travel has a simple integral control or a combination of integral and local proportional controls so that jitter is apt to occur due to the lack of uniform tape travel.

SUMMARY OF THE INVENTION

The object of the present invention is to provide a compact and light weight transverse scanning type magnetic video tape recording and playback apparatus which has a rotary head drum having eight video heads.

Another, object of the present invention is to provide a compact and light weight magnetic video tape recording and reproducing apparatus which conquers the above disadvantages of the prior art apparatus.

A further object of the present invention is to provide an eight-head magnetic video tape recording and reproducing apparatus which is able to realize higher density recording by increasing tracking accuracy than the conventional apparatus.

A still further object of the present invention is to provide an eight-head magnetic video tape recording and reproducing apparatus which results in a decrease in the deterioration of the recording and reproducing characteristics of the audio signal in the case of high density recording by using narrower width tape.

Yet another object of the present invention is to provide an eight-head magnetic video tape recording and reproducing apparatus in which a recording and reproducing system for a control signal, and a capstan servo system are arranged with an appropriate recording position of the control signal in such a way that high tracking accuracy required for reproduction can be assured, even in the case of high density recording of a video signal in which a thin magnetic tape is utilized, tape travelling speed is lowered and the width of the video track is narrowed.

In order to achieve the above mentioned objects, according to the present invention, the rotary head drum has a diameter substantially equal to two inches, eight video heads are mounted on the circumferential surface of the rotary head drum and are arranged to be equidistant from one another in the direction of the circumference of the rotary head drum, and the width of the magnetic tape is determined to about one inch.

In a preferred embodiment of an eight-head video tape recording and reproducing apparatus according to the present invention, there are provided two coupling means which rotate together with the 8-head rotary head drum so as to receive or supply signals between the coupling means and the eight rotary heads. Each of the coupling means has four signal coupling elements, for example, slip rings or rotary transformers which are arranged to be equidistant from each other on one circumference. The arrangement of the signal coupling elements between the two coupling means are shifted with respect to one another. The two coupling means being rotated together with the rotary heads. Further, there are provided two recording amplifiers and two reproducing amplifiers. An input/output circuit of the rotary head is arranged in such a way, that each video head of the rotary head drum is coupled to the two recording amplifiers or to two reproducing amplifiers alternately through said two coupling means.

In another preferred embodiment of an eight-head video tape recording and reproducing apparatus according to the present invention, when the frame signal and the high frequency signal having a frequency equal to an integer multiple of the frequency of the frame signal are recorded on a magnetic tape as a control signal in a multiple form, the high frequency signal is recorded in such a way that m cycle pulses of the high frequency signal within the period of the frame signal are eliminated, and in the reproducing mode the high frequency signal in which said m-cycle interval is eliminated is reproduced and then the thus eliminated period is detected so as to produce the frame signal.

In a further preferred embodiment of an eight-head video tape recording and reproducing apparatus according to the present invention, a control track traverses video track, in a direction parallel to the direction of tape travel and away from both of the side end portions of the tape in the direction of tape width, and a control head is arranged at a position just ahead of the video head in the tape travel direction and corresponding to the position of the control track.

Further, in a preferred embodiment of an eight-head video tape recording and reproducing apparatus according to the present invention, jitter of the eight-head magnetic video tape recording and reproducing apparatus is decreased by suitable integral, proportional, differential and local proportional control systems.

BRIEF DESCRIPTION OF THE DRAWINGS

The present invention will be explained in more detail with referring to the accompanying drawings, in which:

FIG. 8 is a block diagram showing an embodiment of the capstan servo circuit of FIG. 1;

FIG. 9 is an explanatory diagram showing the relation between the arc span of the head drum and the arc height thereof;

FIG. 10 is a schematic diagram showing the basic disposition of an eight-head video head drum of a magnetic video tape recording and reproducing apparatus according to the invention;

FIG. 11 is an explanatory diagram of the circular arc portion of the magnetic tape which is formed by the eight-head video head drum shown in FIG. 10;

FIG. 12 shows an embodiment of the eight-head video head drum according to the invention in which the video head drum is applied to a conventional female tape guide;

FIG. 15 is a circuit diagram of one embodiment of the gate pulse generator of FIG. 14;

FIGS. 16A-16U illustrate various waveforms generated at respective parts of FIGS. 14, 15, 17 and 18;

FIG. 17 is a circuit diagram of an embodiment of the gain switcher of FIG. 14;

FIG. 18 is a circuit diagram of an embodiment of the switcher of FIG. 14;

FIG. 19 is a block diagram showing a modification of the embodiment of FIG. 14;

FIGS. 20A-20J illustrate various waveforms generated at of respective parts of FIG. 19;

FIG. 21 is an explanatory diagram of an embodiment of the input/output circuit of FIG. 14 which has rotary transformers;

FIG. 22 is an explanatory diagram of the relationship between the coupling factors of the rotary transformers and the rotating angles;

FIG. 23 is a side view of an embodiment of the rotary transformer;

FIG. 24 is a sectional view along line A—A of FIG. 23;

FIG. 25 is a block diagram of a control track recording/reproducing amplifier in an eight-head video tape recording and reproducing apparatus according to the invention;

FIGS. 26A-26I illustrate various waveforms generated at respective parts of FIG. 25;

FIG. 27 is a circuit diagram of an embodiment of the recording/reproducing amplifier of FIG. 25;

FIGS. 28, 29 and 30 are a plan view, a side view and a perspective view, respectively, showing the relationship between the magnetic tape and the control head in an eight-head video tape recording and reproducing apparatus according to the invention;

FIG. 31 is a plan view showing a modification of the embodiment of FIG. 28;

DESCRIPTION OF PREFERRED EMBODIMENTS

The outline of the conventional four-head magnetic video tape recording and reproducing apparatus will be explained with reference to FIG. 1 in advance of the explanation of the present invention.

Figure 1:
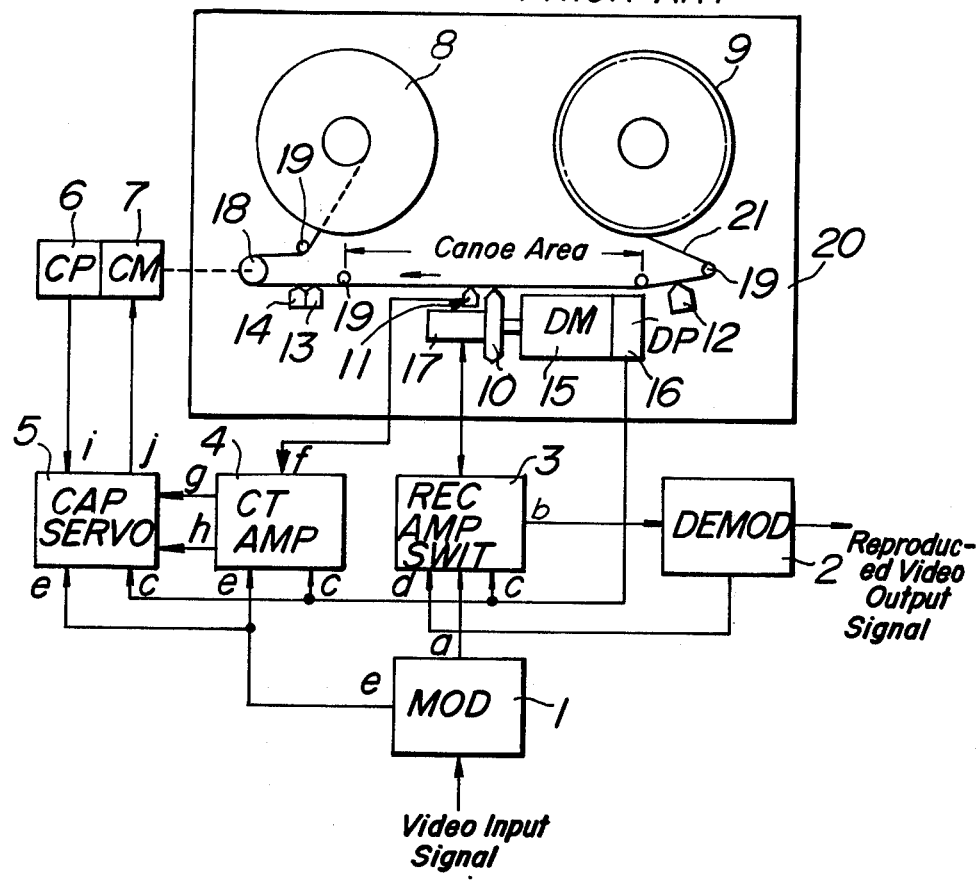
FIG. 1 is a schematic diagram showing an outline of the prior art four-head VTR.

In FIG. 1, reference numerals 1, 2, 3, 4, 5 and 6 denote a video modulator, a video demodulator, a recording amplifier and switcher portion, a control track recording/reproducing amplifier, a capstan servo circuit and a capstan tachometer pulse generator, respectively. Reference numerals 7, 8 and 9 denote a capstan motor, a take-up reel and a supply reel, respectively. Reference numerals 10, 11, 12, 13 and 14 denote a video head drum, a control track recording/reproducing head, a video erasing head, an audio erasing head and an audio recording/reproducing head, respectively. Reference numerals 15, 16, 17 and 18 denote a drum motor, a drum tachometer pulse generator, a video head input/output circuit and a capstan, respectively. Reference numerals 19, 20 and 21 denote a guide post, a tape travelling deck and a magnetic video tape, respectively.

In the recording mode, a record input video-sync composite signal (referred to as a rec vs signal, hereinafter) is supplied to the video modulator 1 to perform frequency modulation at a center carrier frequency approximately equal to 10 MHz. The radio or high frequency signal a which is frequency modulated by the rec vs signal is amplified in the recording amplifier of the recording amplifier and switcher portion 3. The amplified signal is supplied to four video heads (not shown) mounted on the rotating head drum 10 through the input/output circuit 17 so as to record the rec vs signal subsequently in the transverse direction on the magnetic video tape 21, corresponding to the rotation of the head drum 10. The drum tachometer pulse generator 16 is coupled to the drum motor 15 which drives the head drum 10. This generator 16 generates a drum tachometer pulse c (referred to as a drum tach pulse, hereinafter) which is a pulse signal having a frequency proportional to the rotating speed of the motor 15. This drum tach pulse signal c controls the rotation of the motor 15 by keeping a given phase relation with respect to a reference frame pulse e which will be described hereinafter.

The magnetic video tape 21 is fed by the capstan 18 which is driven by the capstan motor 7, to which the capstan tachometer pulse generator 6 is coupled to produce capstan tachometer pulses i (referred to as a cap tach, pulse hereinafter), the number of which is proportional to the rotating speed of the capstan 18. The capstan servo circuit 5 controls the rotation of the capstan motor 7 in such a way that the cap tach pulse i maintains a given phase relation with respect to the drum tach pulse c, so that the motors 15 and 7 rotate synchronously.

On the other hand, the modulator 1 separates the vertical synchronizing signal from the rec vs signal. Every other vertical synchronizing signal is extracted as a reference frame pulse e (referred to as a ref frm pulse, hereinafter). This ref frm pulse e and the drum tach pulse c are applied to the control track recording/reproducing amplifier 4 and are mixed after suitable wave shaping so as to produce a control track signal f which is applied to the control head 11. The control track signal f is recorded longitudinally in one part; for example, the lower end of the tape 21.

In the reproducing mode, the composite video signal having a station synchronizing signal (referred to as a st sync signal, hereinafter) is applied to the modulator 1 so as to obtain the ref frm pulse e related to the st sync signal, in order to synchronize a playback video-sync composite output signal (referred to as a pb vs signal) from the demodulator 2 with the st sync signal. Alternatively, the st sync signal itself may be employed as the source of the ref frm pulse e. The drum motor 15 is rotated in synchronism with the ref frm pulse, as in the recording mode. The modulated radio frequency signals are picked up sequentially by the four heads on the head drum 10 which is rotating. The picked up signal is applied to the recording amplifier and switcher portion 3 through the input/output circuit 17 during each period in which each head produces an output signal. In the portion 3, the modulated radio frequency signal is equalized in a suitable manner corresponding to each head. Then the fragmentary signal is switched at a time which is selected so that it will not influence the image on the screen, for example, at the occurrence of the front porch pulse d within a horizontal blanking pulse period of the pb vs signal, and is mixed to reconstitute the continuous signal b. This continuous signal b is applied to the demodulator 2 from which the pb vs signal is reproduced. The front porch pulse d within the front porch period is formed from the pb vs signal and is applied to the recording amplifier and switcher portion 3 so as to control the above switching.

The control track signal f reproduced from the control head 11 is amplified by the control track amplifier 4. A control track high frequency signal g (referred to as a ct signal, hereinafter) and a control track frame signal h (referred to as a ct frm signal, hereinafter) are separated from the amplified signal in the amplifier 4. These signals g and h are applied to the capstan servo circuit 5. In the capstan servo circuit 5, the phases of said ct frm pulse h and the ref frm signal (pulse) e are compared so as to establish a given phase relationship between these pulses h and e by controlling the rotation of the capstan motor 7. After the given phase relation has been established, the phase comparison between the ct signal g and the drum tach proceeds automatically so that these signals g and c have a given phase relation by controlling the rotation of the capstan motor 7 more precisely. By adequately adjusting these phase relations, not only the video head can trace the video track on the magnetic video tape 21, but also the video track recorded by a particular video head can be reproduced by the same video head and the pb vs signal synchronized with the st sync can be obtained. The reason will be explained in the following.

In the recording mode, if the first video head contacts the magnetic video tape 21 when the ref frm pulse e is received, the portion of vertical synchronizing signal in the rec vs signal which corresponds to the ref frm pulse is written in the video track of the tape and the frame pulse of the control track signal is written in the control track by the control head 11. Since in the reproducing mode the operation of the drum servo is the same as in the recording mode, the first video head contacts the magnetic video tape 21 when the ref frm pulse e is received. At the same time, the capstan servo circuit 5 controls the tape travel so as to produce the ct frm pulse, so that the first video head is picking up the video track including the vertical synchronizing pulse which was recorded by the first video head itself. That is to say, in the reproducing mode, when the vertical synchronizing pulse of the st sync corresponding to the ref frm pulse is received, the portion of the vertical synchronizing pulse corresponding to the ref frm pulse is also reproduced, so that the pb vs signal is in synchronism with the st sync pulse.

Next, each part of the magnetic video tape recording and reproducing apparatus shown in FIG. 1 will be explained in more detail.

Figure 2:
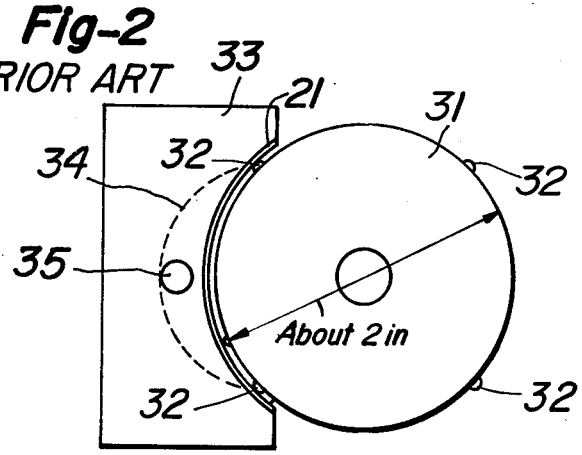
FIG. 2 is an explanatory diagram of the four-head video head drum of the prior art four-head VTR.

The detail of the video head drum 10 is shown in FIG. 2. In FIG. 2, four video heads 32 are arranged equidistant from one another on the circumference of a rotary head drum 31 in such a way that at least one of these four video heads 32 always contacts the magnetic video tape 21. That is to say, the magnetic tape having a width of about two inches contacts, in the direction of its width, the video head drum 31 having a diameter of about two inches along approximately a 110° circular arc of the head drum 31. The reason why the magnetic video tape 21 contacts the video head drum along the circular arc of about 110° in this way is that the audio track and the control track in addition to the video track are recorded on the magnetic video tape 21. If the total width of magnetic tape is used only for the video track, it is sufficient in principle to change the diameter of the head drum in such a manner that the magnetic tape contacts the head drum along a circular arc of about 90°. In this prior art apparatus, in order to make the magnetic video tape form a circular arc in the direction of the tape width, a female tape guide 33 has a vacuum recess 34 which is connected to a vacuum pump (not shown) through an air pipe 35, so that the magnetic video tape 21 is attracted to the arc surface of the female tape guide 33 by the vacuum pump.

Figure 3:
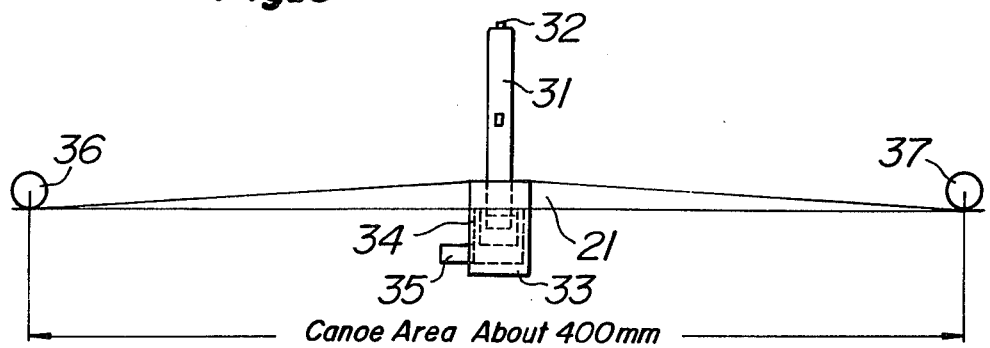
FIG. 3 is an explanatory diagram of the circular arc portion of the magnetic tape which is formed by the prior art VTR shown in FIG. 1.

Here, the length of the canoe area, or the length of the magnetic tape which is required to make the magnetic tape form the circular arc, i.e. the distance between posts 36 and 37 in FIG. 3 is approximately 400 mm. Relating to this part of the magnetic video tape 21, it is natural that the length of the side end of the tape should be different from that of the center of the tape. This difference in length, however, can be included within an allowance of tape stretch, by setting the length of the canoe area at approximately 400 mm. Further, the tape stretching ratio of the side end portion of the tape to the center portion of the tape in this case is calculated to be approximately 1.0018. Accordingly, in the prior art magnetic video tape recording and reproducing apparatus, the tape length required for forming the circular arc cannot be shortened, because the curvature length in the width direction of the tape contacting the video head cannot be lessened, so that it is not possible to make compact the tape travelling mechanism.

Figure 4:
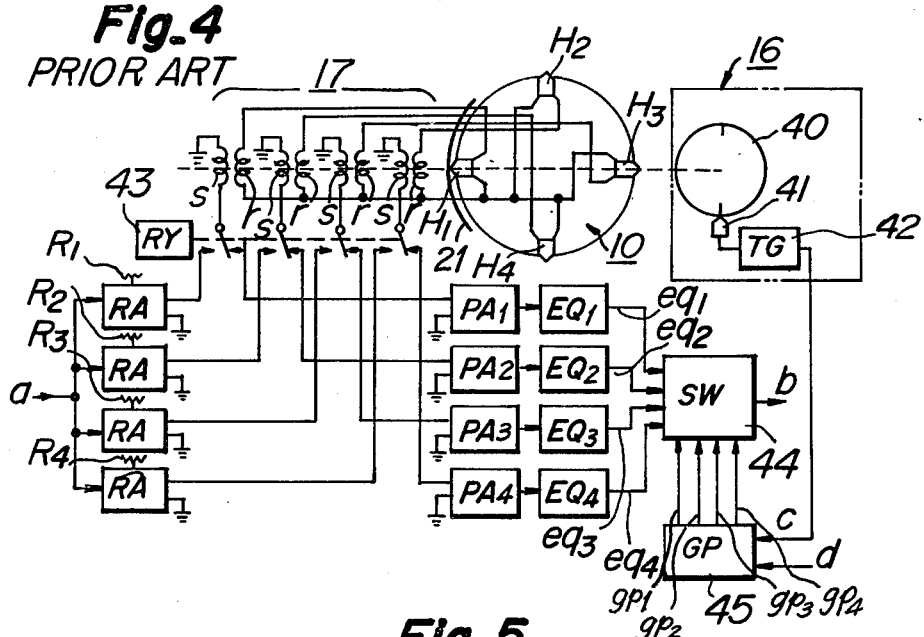
FIG. 4 is a diagram of one embodiment of the recording amplifier and switcher portion, the drum rotary pulse generator and the video input/output circuit of FIG. 1.
Figure 5:
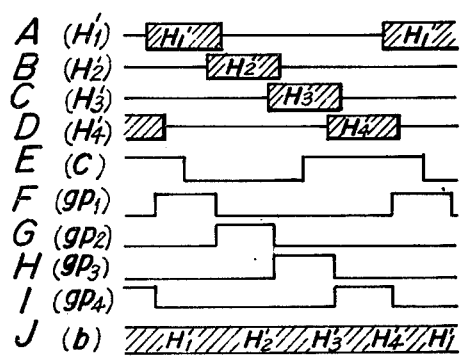
FIGS. 5A-5J illustrate various waveforms of respective parts of the circuit of FIG. 4.

The recording amplifier and switcher portion 3 in FIG. 1 is shown in FIG. 4 together with the head drum 10, the drum tachometer generator 16 and the input/output circuit 17. In FIG. 4, the input/output circuit 17 is composed of the conventional rotary transformer. In FIG. 4, the video head drum 10 has four rotary heads H1-H4, to each of which a rotor winding r of each winding pair of the rotary transformer 17 is connected. The rotor winding r rotates together with the head drum 10 and a tachometer disc 40. In FIG. 4, a reference numeral 41 denotes a tachometer head. A reference numeral 42 denotes a pulse generator which produces a drum tachometer pulse in response to the reception of the output from said head 41. These parts 40, 41 and 42 compose the drum tachometer pulse generator 16. The drum tach pulse c which is the output of the pulse generator 16 is a symmetric rectangular wave having one cycle corresponding to one rotation of the rotary phase detection disc 40. A stator winding s of each winding pair is fixed and has electromagnetic coupling with the rotor winding r so as to supply the input to the rotary heads H1-H4 or to receive the output from the rotary heads H1-H4.

In the recording mode, a relay 43 operates. The high frequency signal a modulated by the video signal is amplified by four amplifiers RA1-RA4, the outputs of which are applied to the rotary heads H1-H4 through the windings s and r of the rotary transformer 17 so as to record the modulated video signals in turn on the travelling magnetic video tape 21 which keeps approximately 110° contact with the head drum 10. Here, variable resistors R1-R4 are to be adjusted in accordance with the characteristics of the heads H1-H4, whereby the recording current from each of the recording amplifiers RA1-RA4 is adjusted to have an optimum current value.

In the reproducing mode, the relay 43 is inoperative. The signal reproduced from the magnetic tape 21 by the heads H1-H4 is applied to four preamplifiers PA1-PA4 through the windings s and r of the rotary transformer 17 and the relay contacts of the relay 43. The signals amplified by these preamplifiers PA1-PA4 are applied to equalizers EQ1-EQ4 so as to compensate characteristics of the respective heads. The output signals eq1--eq4 of the respective equalizers EQ1-EQ4 are applied to a switcher 44.

On the other hand, the drum tach pulse c obtained from the drum tachometer pulse generator 16 and the front porch pulse d formed from the pb vs signal are applied to a gate pulse generator 45. Since the magnetic video tape 21 contacts the head drum 10 over a slightly larger angle (about 110°) than the mounting angle (about 90°) of the heads after amplification and equalization occur sequentially and overlap each other. Accordingly, said gate pulse generator 45 produces a series of four gate pulses gp1-gp4 from the drum tach pulse c and the front porch pulse d. These gate pulses gp1-gp4 have a pulse width equal to or less than the respective signal periods of signals eq1-eq4, and the leading and trailing edges of the gate pulses gp1-gp4 are positioned to be within a front porch of the horizontal blanking period and within a period of the above overlap, respectively. Signals eq1-eq4 are gated by the gate pulses gp1-gp4 and then are combined to produce the continuous signal b. The operation of the switcher 44 is shown in FIGS. 5A–5J. In these FIGS. 5A–5J, H1'–H4' mean the output signals of the heads H1–H4, respectively. Since the heads are changed within a blanking period, even if noise is produced by this changing, this noise does not appear on the screen. This prior art signal input/output system employing the rotary transformer 17 has the following disadvantages. (1) The number of the windings r and s of rotary transformer 17, the recording amplifiers RA, the reproducing preamplifiers PA, the equalizers EQ, and so on are required to be as many as the number of rotary heads. Therefore, in the case of eight heads, the amount of circuitry increases, and the rotary transformer must be larger. (2) In the recording mode, the recording current is conducted wastefully even to the heads which are not in contact with the tape, so that power consumption increases in the case of eight heads.

Next, details of the control track recording and reproducing amplifier 4 will be described. In general, the control signal for tape tracking is composed of two kinds of signals, that is to say, a sine wave signal having a comparatively high frequency for increasing tracking accuracy, for example, 240 Hz in the case of the four-head VTR and a frame signal (30 Hz) for phase locking the reproduced picture with the external synchronizing signal.

In order to multi record or reproduce this control signal, the frame signal is superimposed on the high frequency sine wave signal so as to form a recording current wave signal in the conventional apparatus. This recording current wave signal is recorded on the magnetic tape through the control signal recording/reproducing head. In the reproducing mode, the voltage wave signal reproduced from the control head is processed in a suitable way to separate the sine wave signal and the frame signal.

Figure 6:
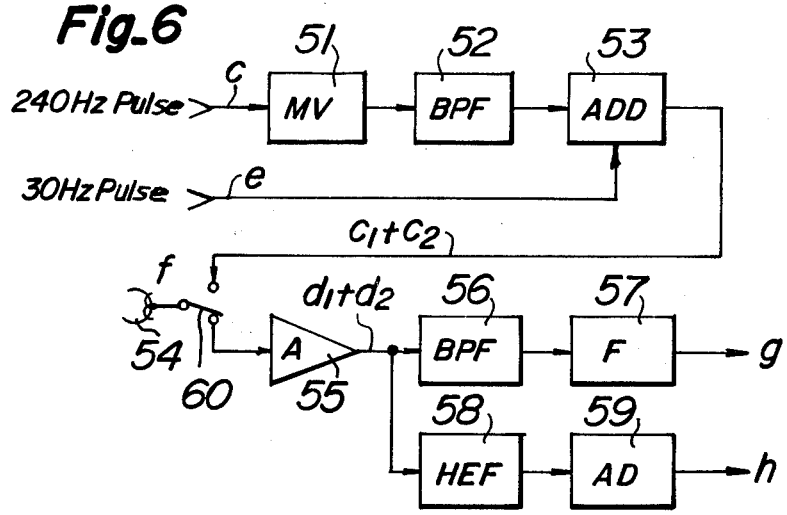
FIG. 6 is a block diagram showing an embodiment of the control track recording/reproducing amplifier of FIG. 1.

This prior art technique will be explained with reference to FIGS. 6 and 7A–7F. FIG. 6 shows one embodiment of the prior art recording and reproducing amplifier circuit for the control signal, and FIGS. 7A–7F illustrate various waveforms corresponding to respective parts of FIG. 6.

Figure 7:
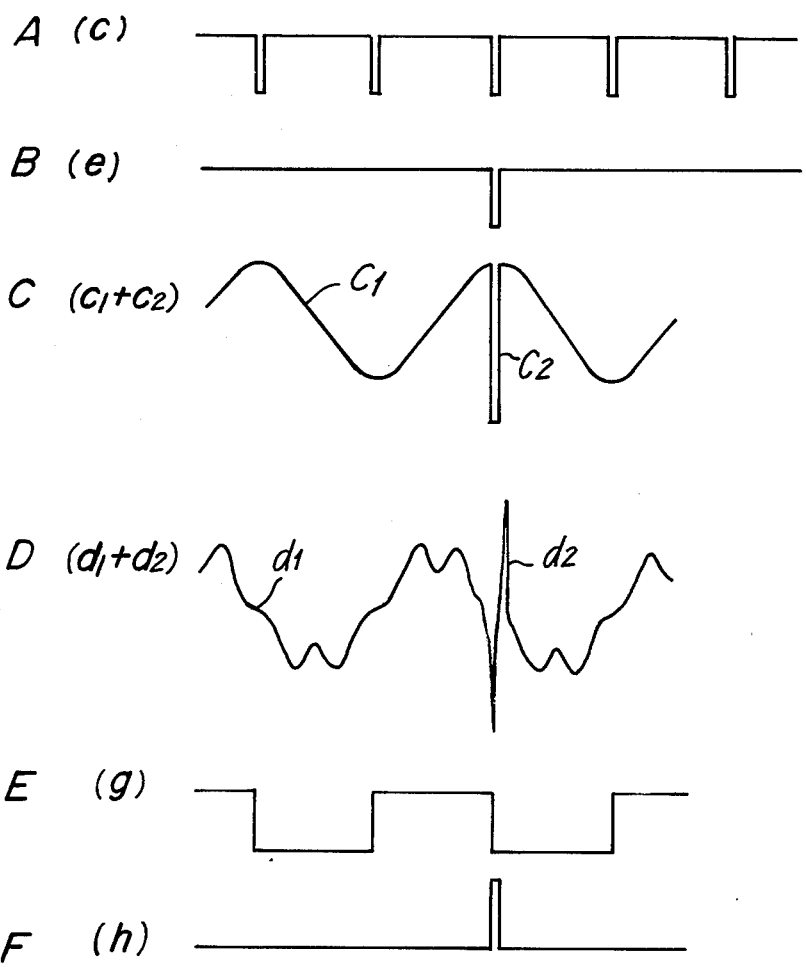
FIGS. 7A-7F illustrates various waveforms generated at respective parts of the block diagram shown in FIG. 6.

In the recording mode, input e is the ref frm pulse of 30 Hz which is related to the synchronizing signal for driving the VTR (refer to FIG. 7B) and input c is the drum tach pulse of 240 Hz which is related to the rotation of the video head drum in phase lock with the ref frm pulse of 30 Hz (refer to FIG. 7A). This 240 Hz drum tach pulse c drives a monostable multivibrator 51 so as to form a symmetric rectangular wave which is changed to a sine wave signal by a band pass filter 52. This sine wave signal is combined with the 30 Hz ref frm pulse e by a mixer 53 so as to form a recording current wave signal $c_1 + c_2$ (refer to FIG. 7C) composed of a 240 Hz sine wave $C_1$ and a 30 Hz frame pulse $C_2$. This signal $C_1 + C_2$ is applied to a control signal recording/reproducing head 54 through a recording/reproducing change switch 60.

In the reproducing mode, the output of the control head 54 is amplified by an amplifier 55 through the change switch 60 so as to obtain a reproduced voltage wave signal $d_1 + d_2$. This voltage wave signal $d_1 + d_2$ has the waveform shown in FIG. 7D, because of the nonlinearity due to the saturation recording and the differential characteristic in the reproducing mode. This voltage wave signal $d_1 + d_2$ is applied to a band pass filter 56 having, for example, a narrow pass band of 240±1 Hz, from which a fundamental component $d_1$ of 240 Hz is extracted as the high frequency sine wave. In this case, a wave distortion component and the 30 Hz component $d_2$ in the reproduced voltage wave signal $d_1 + d_2$ are removed. This sine wave $d_1$ is applied to a rectangular wave shaper 57 so as to obtain a symmetric rectangular ct signal g of 240 Hz (refer to FIG. 7E). On the other hand, the reproduced voltage wave signal $d_1 + d_2$ is applied to a high pass filter 58 so as to eliminate the 240 Hz component $d_1$ and to emphasize the 30 Hz component $d_2$. The output of this filter 58 is applied to an amplitude discriminator 59 so as to obtain a 30 Hz ct frm pulse h (refer to FIG. 7F). These outputs g and h correspond to the timing pulses c and e related to the synchronizing signal, respectively. Correct tracking can be realized by controlling the tape travel so as to maintain given phase relationships between the signals c and g, and e and h in the reproducing mode.

This prior art control signal system has the following two principal disadvantages.

(1) In the reproducing circuit, the band pass filter is utilized to remove the 30 Hz pulse, so that the band width of the tape travelling servo loop including the band pass filter is narrow and deteriorates the phase characteristic in the high frequency range. As a result, the loop gain cannot be increased, so that tape travelling jitter cannot be suppressed sufficiently and therefore tracking accuracy decreases.

(2) In the recording wave signal $c_1 + c_2$ in FIG. 7C, the frequency band widths required for recording the sine wave signal $c_1$ and the pulse $c_2$ are different, so that the band width cannot be used effectively. That is to say, if the frequency of the sine wave signal $c_1$ is set higher than 240 Hz, in order to distinguish the pulse $c_2$ having a trailing edge sharper than the maximum gradient of the sine wave signal $c_1$, the frequency of the sine wave signal $c_1$ cannot be increased more than one tenth of the maximum frequency to be recorded. Further, the capstan servo system is a sample value control system in which the control signal is a sampling signal, so that the higher the sampling frequency the less the phase lag of the high frequency region in sampling hold, and accordingly the loop gain can be increased, i.e., the jitter can be suppressed. As a result, in order to improve the tracking accuracy, for example, when a video head having a narrow width is utilized to realize a high density magnetic recording, it is desirable to increase the frequency of the control signal up to around the critical recording frequency. In this case, the maximum frequency component to be recorded among the higher harmonics components of the pulse $c_2$ is coincident with the frequency of the sine wave signal $c_1$, so that it is not possible to multi-record with a form of pulse such as the recording current wave signal c.

When the magnetic video tape is wound over an about 110° arc around the head drum so as to move the tape while the tape holds a semicylindrical shape, and the lower end of the tape contacts the control head so as to record or reproduce signals on the control track located at the side end of the tape, there are the following disadvantages.

(1) Since the side end portion of the magnetic tape is more flexible than the center portion thereof and the form of the side end portion is variable because of its substantially semicylindrical curvature, the relationship of the relative position between the side end portion and the center portion is apt to vary in response to the variation of tape tension. As a result, the relative phase of the control signal on the control track to the video track changes, so that there occurs an error in tracking of the picture signal. (2) The control signal is recorded on the lower side end portion of the tape which is curved semicylindrically and is reproduced from the same portion, so that the contact between the tape and the head is unstable. The amounts of partial stretch of various portions of the tape are different, so that the azimuth of the control track varies. Because of this unstableness and variation, the reproduced level of the control signal varies. This level variation is transformed into a phase variation during processing of the wave form. This phase variation also causes tracking error.

The thinner the tape thickness and the shorter the recording wave length of the control signal on the control track, the more severe the above influences. These are obstacles to the improvement of recording density by means of a thin magnetic tape and narrow width video track. Especially, relating to the tracking of a narrow width video track, it is necessary to make the frequency of the control signal higher than the usual frequency of 240 Hz in order to improve the jitter of tape travelling. Accordingly, in addition to the low speed travelling, the recording wave length of the control signal on the control track is shorter, so that the influence of the above item (2) is more remarkable.

In addition, the prior art capstan servo circuit employs a simple integral control or a combination of integral control and local proportional control as shown in FIG. 8, so that the tape travelling speed is not uniform and causes jitter. In FIG. 8, reference numeral 61 denotes a recording/reproducing change switch. In the recording mode [position "R"], the drum tach pulse signal c supplied from the drum tachometer pulse generator 16 and proportional to the number of drum rotations and the cap tach pulse signal i supplied from the capstan tachometer pulse generator 6 and proportional to the number of capstan rotations are applied to a phase comparator 62 for integral control so as to compare the phases of the pulse signals c and i. The cap tach signal i is also applied to a frequency discriminator 63 for local proportional control. The outputs of comparator 62 and discriminator 63 are added by an adder 64. The output of the adder 64 is amplified by an amplifier 65, from which a d.c. voltage comprising a capstan motor driving signal j is applied to the capstan servo motor 7. On the other hand, in the reproducing mode [position "P"], the ct frm signal h obtained from the control track recording/reproducing amplifier 4 and the ref frm signal e separated by the modulator 1 are applied to a phase lock detection circuit 66 composed of a phase comparator for detecting coincidence of the phases of signals h and e. Before this phase coincidence output is obtained, the contacts of a reproducing mode change switch 67 are in the positions shown in FIG. 8. In this condition, the comparator 62 executes a phase comparison in the 30 Hz mode. After the above phase coincidence has been detected, the relay 67 operates to change the contacts to the opposite position. Then the phase comparison between the signals g and c is executed in the high frequency mode.

Now, a magnetic video tape recording and reproducing apparatus according to the invention will be explained hereinafter with reference to FIGS. 9-35. The present invention is an improvement of the above parts 3, 4, 5, 10, 11 and 17 and provides a compact and light weight eight-head magnetic video tape recording and reproducing apparatus. These improved parts will be described in the following.

FIG. 9 is an explanatory diagram showing a relationship between the arc span of the head drum and the arc height thereof. If there is a circle having a radius r, the arc height for a center angle of 90° is 0.293 r, whereas the arc height for a center angle of 45° is 0.078 r. That is to say, if the center angle is one half of the center angle of about 90°, then the arc height decreases to about one quarter of the arc height corresponding to the center angle of about 90°. The present invention advantageously utilizes this principle of arc relation.

In a video head drum with eight heads according to the invention, eight video heads 71 are mounted on a rotary video head drum 70 having a diameter of about two inches and arranged to be equidistant from one another in the direction of circumference of the rotary video head drum 70, as shown in FIG. 10. The magnetic video tape 72 which is utilized in the invention has a width of about one inch so as to decrease the contacting angle between the magnetic tape 72 and the head drum 70 to approximately one half of the conventional angle of 110°, i.e. about 55°. This narrower angle makes it easier to dove the tape hold the circular arc form in the direction of the tape width. According to the invention, therefore, it is not necessary to use a vacuum suction to ensure that the tape conforms to the shape of a female guide, so that there is no need to install a vacuum pump in the magnetic video tape recording and reproducing apparatus according to the invention and the total size and weight thereof can be reduced.

In this embodiment of a magnetic video tape recording and reproducing apparatus or a VTR according to the invention, a portion of the magnetic tape corresponding to a center angle of about 10° is assigned to tracks other than the video track. In the case of a recording in which a video track and other audio and control tracks are superimposed, as will be described later, however, the contacting angle between the tape 72 and the head drum 70 may be set at about 45° in principle, so that this contacting angle of about 45° facilitates the formation of a circular arc.

According to the invention, the tape length required for forming the above circular arc or a length of canoe area between guide posts 74 and 75 as shown in FIG. 11 is about 110 mm, which is about one quarter of the length of the conventional canoe area, i.e. 400 mm (refer to FIG. 3). Therefore, this invention can realize a compact magnetic video tape recording and reproducing apparatus.

One embodiment of a VTR according to this invention in which the video head drum is applied to the conventional female tape guide is shown in FIG. 12. In FIG. 12, a female tape guide 76 controls the circular arc formation and the positions of the upper and lower sides of the magnetic tape 72. That is to say, the female tape guide 76 forces the the magnetic tape into a concave configuratin in its width direction around the surface of the rotary head drum 70 so as to hold the tape in the circular arc form. A position control member 77 which is coupled to the tape guide 76 integrally controls the positions of the upper and lower sides of the tape 72. The female tape guide 76 in FIG. 12 is shown in a displaced position, but actually the tape guide 76 is attached slidably in the direction shown by an arrow in FIG. 12 to a support member which is fixed on a substrate (not shown). This assembly facilitates loading of the magnetic tape 72. A positioning member 78 controls the pressing position of the tape guide 76. The eight video heads mounted onn the circumference of the head drum 70 contact the magnetic tape 72 in turn when the head drum 70 is rotated.

Figure 13:
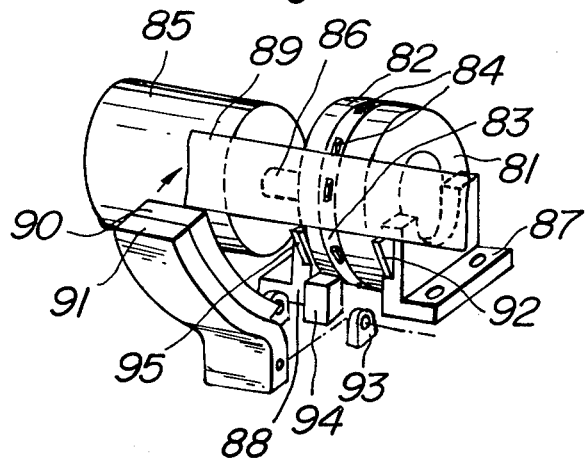
FIG. 13 shows another embodiment of the eight-head video head drum according to the invention.

FIG. 13 shows another embodiment of a head drum and a tape guide according to the invention, in which a model surface for forming a circular arc is provided on the head drum side of the magnetic tape in order to decrease the contacting pressure between the magnetic tape and the video head thereby increasing the operating life of the video head. In FIG. 13, male tape guides 81 and 82 control the formation of a circular arc and the positions of the upper and lower sides of the magnetic tape. Eight video heads 84 are mounted be equidistantly on the circumference of the head drum 83. The head drum 83 is rotated by a shaft 86 of a driving motor 85. The male tape guides 81 and 82 are fixed on a substrate (not shown) by supporting members 87 and 88 and do not rotate together with the head drum 83. The magnetic tape 89 is pressed against the male tape guides 81 and 82 to form a circular arc by a tape holding pad 90 and by a pad support 91. The tape holding pad 90 is made of resilient material and has a shape which is easily variable so that it conforms to the tape curvature. The upper and lower side positions of the tape are set by a positioning member 92 which is attached to the male tape guides 81 and 82. The pad support 91 is rotatably supported by a supporting member 93 fixed on a substrate (not shown) so as to facilitate loading of the magnetic tape 89. The position of the pad support 91 in the direction of tape holding is set by a positioning member 94.

If a tape having a length of 115 m (which can record for about ten minutes with a tape travelling speed of 190.5 mm/s) is utilized, the radius of the wound tape is about 90 mm, so that the size of the tape travelling deck (refer to the deck 20 in FIG. 1) may be approximately 200 mm long and 220 mm wide. Thus, the size of the deck achieved by the present invention is very compact. Further, the tape part may be realized as a tape cassette approximately 160 mm long and 220 mm wide.

As is clear from the above, the present invention can provide an increasingly compact and light weight VTR compared with the prior art four-head VTR for broadcasting purposes without losing the advantageous electrical characteristics of the prior art four-head VTR. Accordingly, a VTR according to the present invention has good mobility and is best suited for field pick up. In addition, according to the present invention, the recording and reproducing characteristic of the audio signal, which cause trouble in the case of high density recording, is not deteriorated.

Here, one embodiment of an input/output circuit and a recording amplifier and switcher portion according to the present invention will be explained with reference to FIG. 14.

In this embodiment, slip rings S1, S2 and S3 are arranged in parallel on one cylinder (not shown) which rotates together with a head drum 100 and tachometer discs 101 and 102. Brushes b1, b2 and b3 which contact slip rings S1, S2 and S3 respectively are fixed. The slip rings S1 and S2 are respectively divided into four sections corresponding to one half of the number of rotary heads. The dividing point of one slip ring is arranged to be positioned in the middle of one segment of another slip ring. The slip ring S3 is a continuous cylinder. One end of a head winding (not shown) of each of eight rotary heads H1-H8 is connected to every other segment of slip rings S1 and S2 alternately in the direction of rotation, and the other ends of the head windings are connected to the slip ring S3 in common. The mounting angle of the slip rings on the head drum is determined in such a way that when one head (for example H1) contacts the middle portion in the direction of width of a magnetic tape 103 which travels in the direction perpendicular to the plane of the drawing of FIG. 14, a brush (b1 in this example) contacts the middle portion of one segment of one slip ring (S1 in this example) which is connected to head (H1).

Figure 14:
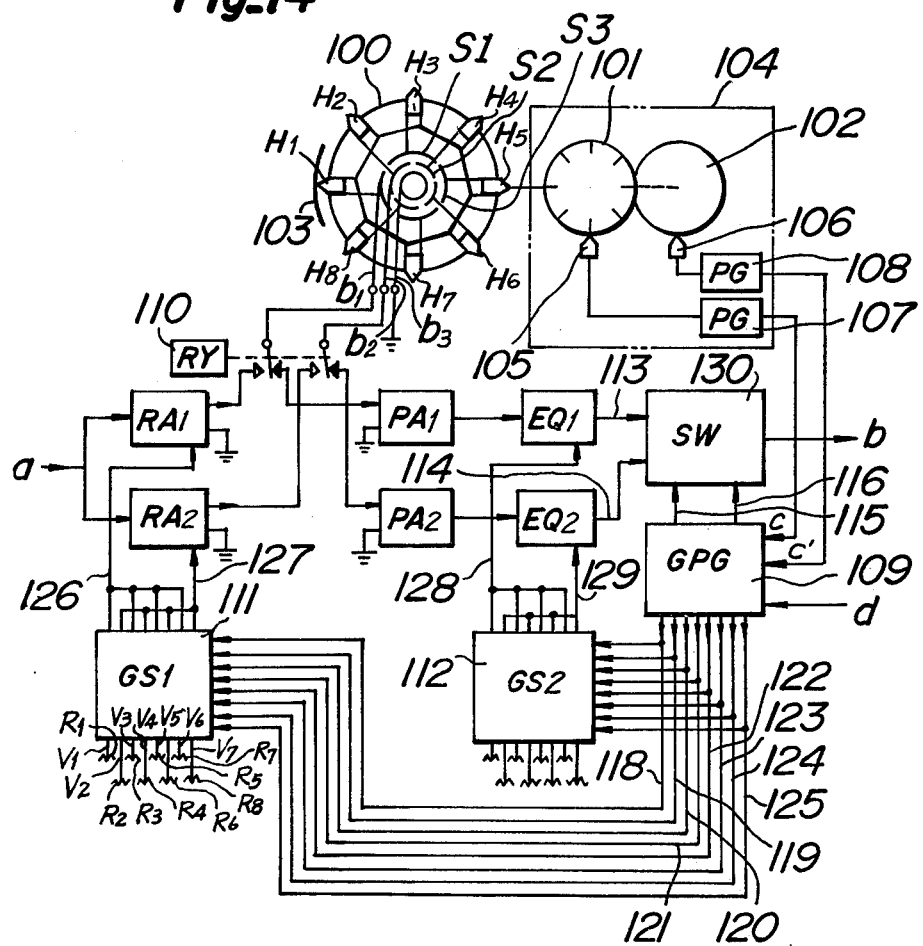
FIG. 14 is a block diagram of an embodiment of an input/output circuit and a recording amplifier and switch portion of an eight-head video tape recording and reproducing apparatus according to the invention.

In FIG. 14, a drum tachometer pulse generator 104 is composed disc 101 which produces eight pulses during each revolution, disc 102 which produces one pulse per revolution, tachometer heads 105 and 106 which are arranged facing discs 101 and 102, respectively, and pulse generators 107 and 108 which receive the outputs of tachometer heads 105 and 106 to produce pulses, respectively. The respective outputs of these pulse generators 107 and 108, i.e. the drum tach pulse c and a reset pulse c' are applied to a gate pulse generator 109 which is described in detail below in connection with FIG. 15.

In the recording mode, a relay 110 operates. The high frequency signal a modulated by the video signal is amplified by two recording amplifiers RA1 and RA2, the outputs of which are distributed to the rotary heads H1-H8 sequentially through the normally open contact of the relay 110 and the brushes b1 and b2 so as to record the signal a on the magnetic tape 103. A reference numeral 111 denotes a gain switcher for correcting unequal of recording characteristics of the eight heads H1-H8. The detail of the gain switcher 111 will be described hereinafter with reference to FIG. 17. This gain switcher 111 is controlled by the gate pulses 118-125 of gate pulse generator 109 so as to produce gain control voltages 126 and 127 which are applied to amplifiers RA1 and RA2 to control the gains thereof, respectively.

In the reproducing mode, the relay 110 is inoperative. The signals reproduced from the magnetic tape 103 through the heads H1-H8 are amplified by two preamplifiers PA1 and PA2 through the brushes b1 and b2 and the normally closed contacts of the relay 110, respectively. The amplified outputs are applied to equalizers EQ1 and EQ2 so as to correct the characteristics of the respective heads H1-H8. The outputs 113 and 114 from equalizers EQ1 and EQ2 are applied to a switcher 130, the detail of which will be described with reference to FIG. 18 hereinafter. The switcher 130 receives gate pulses 115 and 116 from the gate pulse generator 109. The equalizer outputs 113 and 114 are obtained in turn from the switcher 130 under control of gate pulses 115 and 116 so as to form a continuous signal b. A reference numeral 112 denotes a gain switcher for controlling the amounts of equalization in equalizers EQ1 and EQ2. The arrangement of this gain switcher 112 is similar to that of gain switcher 111, and is controlled by the gate pulses 118-125 from the gate pulse generator 109 so as to produce gain control voltages 128 and 129, which are applied to equalizers EQ1 and EQ2 to control the amounts of equalization, respectively.

Detailed embodiments of the gate pulse generator 109, gain switchers 111 and 112, and switcher 130 of FIG. 14 are shown in FIGS. 15, 17 and 18, respectively.

FIG. 15 shows an embodiment of the gate pulse generator 109. In FIG. 15, reference numerals 140 and 141 denote monostable multivibrators, R, C; R', C' are time constant circuits for determining the width of the pulses generated by multivibrators 140 and 141, and r, c; r', c' are differentiating circuits. Reference numerals 142, 143, 144 and 145 denote JK flip-flops, reference numeral 146 denotes a serial shift register having parallel outputs, and reference numeral 147 and 148 denote inverters. Integrated circuits such as the Signetics type NE 555 V, the Texas Instrument type Ser. No. 7473 and the Texas Instrument type Ser. No. 74164 may be employed as the monostable multivibrators 140 and 141, JK flip-flops 142-145 and shift register 146, respectively. The monostable multivibrator 140 is triggered by the drum tach pulse c (FIG. 16D). The pulse width of the output 149 (FIG. 16E) of the monostable multivibrator 140 is adjusted so that the trailing edge of the positive pulse of the output 149 is positioned within a period in which the signals 113 and 114 (FIGS. 16A and 16B) overlap. Actually, this adjustment is performed by watching the reproduced screen and making the adjustment so that the dividing point between the signals does not appear on screen. The flip-flop 142 is triggered by a front porch pulse d which occurs immediately after the leading and trailing edges of the output pulse 149 (FIG. 16E) from the monostable multivibrator 140. The flip-flop 143 is triggered by the output 150 (FIG. 16G) from the flip-flop 142. The two gate pulses 115 and 116 (FIGS. 16H and 16I) are obtained from the Q and $\overline{Q}$ output terminals of the flip-flop 143. These pulses 115 and 116 are opposite in polarity to one another and the leading and trailing edges of gate pulses 115 and 116 are coincident with the front porch pulse. Gate pulses 115 and 116 are applied to the switcher 130.

On the other hand, the monostable mutivibrator 141 is triggered by the trailing edge of the flip-flop output signal 150 so as to form a positive pulse which has a pulse width $T_2/s$ equal to one half of the pulse width $t_3$ of gate pulse 115. The positive pulse is inverted by an inverter 148. The inverted output is applied to the clock input terminal of the shift register 146. This positive pulse itself is applied to flip-flops 144 and 145 which are connected in cascade so as to form a positive pulse which goes positive at the timing of the reset pulse c' and which has a pulse width approximately equal to $2t_3$. This positive pulse is applied to the serial input terminal of the shift register 146, from the eight parallel output terminals of which the gate pulses 118-125 (FIGS. 16L-16S) are obtained. These gate pulses are delayed sequentially by a delay amount equal to one clock pulse interval.

FIG. 17 shows the part of the gain switcher 111 which relates to the output 126. The part corresponding to the output 127 in the gain switcher 111 can be arranged in a similar way. The gain switcher 112 can be arranged also in this way. In FIG. 17, the gate pulses 118, 120, 122 and 124 are applied to gate transistors Q1, Q3, Q5 and Q7 through inverters A1, A3, A5 and A7. Among these gate pulses 118, 120, 122 and 124, only one of them is at a high level, whereas the other pulses remain at a low level. One of the transistors Q1, Q3, Q5 and Q7 to which a high level input is applied turns off, so that the voltage (V1, V3, V5 or V7) divided by a variable resistor (R1, R3, R5, R7) corresponding to the above transistor in question is obtained as an OR output through a diode (D1, D3, D5 or D7). This OR output is the signal 126 (FIG. 16T). The transistors receiving low level inputs are on, so that the diodes corresponding to these transistors are off. The circuit comprising the inverter and gate transistor may be composed of a positive AND driver, for example, the Texas Instrument integrated circuit, type Ser. No. 7451 A.

FIG. 18 shows an embodiment of the switcher 130. In FIG. 18, T1, T3 and T5 are NPN transistors which function as amplifiers and T2 and T4 are NPN switching transistors. Transistor T2 or T4 is on when the gate pulse 115 or 116 is at a high level. In this condition, transistor T1 or T3 is allowed to enable amplification of the equalizer output 113 or 114 which is applied in common transistor T1 or T3. The outputs of transistors T1 and T3 are applied to transistor T5. Since the gate pulses 115 and 116 have high levels alternately, the continuous signal b (FIG. 16J) can be obtained from transistor T5.

Next, the operation of the circuits shown in FIG. 14 will be explained with referring to the various waveforms shown in FIGS. 16A-16U.

In the recording mode, the recording current has started flowing before one head contacts the magnetic tape and will stop flowing after the head is released from that contact that is to say, the recorded signals overlap each other, so that the present invention can make good use of the recording current to prevent a detrimental transient phenomenon owing to the interruption of the recording current. In the case of, for example, the head H1, the segment of the slip ring S1 connected to the head H1 begins to contact the brush b1 at approximately the position of the head H2 in FIG. 14 before the head H1 contacts the magnetic tape 103, and then the recording current begins to flow. The recording current is flowing through the head H1 until the head H1 rotates to reach about the position of the head H8 in FIG. 14. In the right hand position of the head drum 100 in FIG. 14 after the head H1 has passed the above position of the head H8 in FIG. 14, the recording current does not flow through the head H1. During the period corresponding to the right hand position of the head H1, the head H3 is in contact with the magnetic tape 103 to supply the recording current to this head through the brush b1.

In the reproducing mode, the outputs of the heads H1, H3, H5 and H7, which are shown as H140, H3', H5' and H7' in FIG. 16A, appears sequentially from the equalizer EQ1 as the equalizer output signal 113. During the period t1 in FIG. 16A, the segment of the slip ring is in contact with the brush, whereas during a period t2 within the period t1 the head is in contact with the tape and produces the reproduced signal. Actually, the switcher output signal is obtained during a period t3 within the period t2. This period t3 corresponds to the pulse duration of the gate pulse 115 from the gate pulse generator 109. Similarly, the outputs H2', H4', H6' and H8' from the other heads H2, H4, H6 and H8 appear sequentially as the output 114 from the equalizer EQ2, as shown in FIG. 16B and in the period during which the reprouced signals H1', H3', H5' and H7' in the output 113 do not appear. Actually, however, the magnetic tape 103 contacts the head drum 100 over a center angle of about 55° which is larger than the center angle between the two heads, i.e. 45°, the output signals 113 and 114 overlapping each other when they appear in turn. The gate pulse generator 109 produces two gate pulses 115 and 116 from the drum tach pulses c and c' and the front porch pulse d. These gate pulses 115 and 116 are opposite in polarity and have a pulse width shorter than the signal period of signals 113 and 114. The leading and trailing edges of gate pulses 115 and 116 are within a front porch of the horizontal blanking period in the overlapping period. The switcher 130 gates signals 113 and 114 by means of gate signals 115 and 116, respectively. The gated signals are added together so as to form the continuous signal b. Since the heads are changed during the blanking period, the noise caused by this changing, even if it occurs, has no influence on the screen. In addition, when, for example, the brush b1 passes the dividing point of the slip ring S1, the segment of the slip ring S2 contacts the brush b2 so as to reproduce the signal, so that the influence of the dividing point does not appear at all. Therefore, according to this invention, it is not necessary to make the dividing point gap extremely narrow, and the dividing point can be positioned arbitrarily within a period in which the reproduced output signal 113 or 114 does not appear. For example, when eight heads are employed and the contacting angle of the tape is 55°, the gap of the dividing point has an angular degree of freedom of ±17.5°. Within this angle, the position of each dividing point and the gap may be determined differently. This is a great advantage in obtaining a machine working which operates accurately.

Next, the operation of the gain switchers 111 and 112 will be explained. The gains of the recording amplifiers RA1 and RA2 are varied by variable d.c. voltages 126 and 127, respectively, so as to control the recording current. Similarly, the amounts of equalization in the equalizers EQ1 and EQ2 are controlled by variable d.c. voltages 128 and 129, respectively. The operation of the control of the equalizer is analogous to that of the recording amplifier, and therefore only the control of the recording amplifier is explained hereinafter. In FIG. 14, the number of variable resistors R1-R8 is equal to that of the heads H1-H8 and present the d.c. voltages V1-V8 to be applied to the recording amplifiers RA1 and RA2. These voltages V1-V8 are so arranged as to supply optimum recording currents to the respective heads H1-H8. The gate pulse generator 109 produces the eight gate pulses 118-125 (FIGS. 16L-16S) from the drum tach pulses c and c'. These gate pulses 118-125 have a pulse width which is slightly longer than the period t2 during which the respective heads H1-H8 contact with the magnetic tape 103. This pulse width has the same degree of freedom as the slip ring gaps described above. In the gain switcher 111 shown in FIG. 17, the variable d.c. voltages V1, V3, V5 and V7 are gated by the gate pulses 118, 120, 122 and 124, respectively. The gated outputs are added together to form the variable d.c. voltage 126 which is applied to the recording amplifier RA1. Similarly, the variable d.c. voltages V2, V4, V6 and V8 are gated by the gate pulses 119, 121, 123 and 125, respectively. The gated outputs are added together to form the variable d.c. voltage 127 which is applied to the recording amplifier RA2. By means of gain switcher 111, the recording current is adjusted adequately in response to the characteristic of each head just before each head contacts the magnetic tape 103; accordingly, the recording can be performed always in an optimum condition. In the reproducing mode the gain switcher 112 provides optimum equalization in accordance with the characteristic of each head.

Further, in the embodiment shown in FIG. 14, the outputs 113 and 114 of the two equalizers EQ1 and EQ2 are applied to the switcher 130 so as to produce a continuous signal b. Alternatively, this arrangement may be modified as shown in FIG. 19. In FIG. 19, the output of the preamplifiers PA1 and PA2 are applied to a switcher 150, the output of which is applied to one equalizer EQ. The arrangement of the switcher 150 is identical to the switcher 130 shown in FIG. 14 and is controlled by the gate pulses 115 and 116 so as to form the continuous signal b by directly combining the outputs of the two preamplifiers PA1 and PA2. Eight d.c. voltages as equalizing signals from the gain switcher 151 are added together to produce a logical sum "OR" output which is applied to the equalizer EQ and determines eight amounts of equalization corresponding to the respective ones of the eight heads. The gain switcher 151 receives eight gate pulses 181'-125' which are formed by the gate pulse generator 109 in response to the gate pulses 115 and 116, as shown in FIGS. 20A-20J. These gate pulses 118'-125' change the application of voltages V1'-V8' determined by resistors R1'-R8' to the equalizer EQ sequentially, as in the case of FIG. 17.

Further, in FIG. 14, the slip ring and the brush are used to transfer the input or the output. Instead of the brush, a conductor plate opposing the slip ring with a constant narrow gap may be utilized to transfer the high frequency input or output signals through the electrostatic capacity between the opposite slip ring and the conductor plate. In order to maintain a narrow constant distance between the opposite slip ring and the conductor plate, the fluid characteristic of air on the surface of the slip ring may be utilized, as practically used in the floating head of a magnetic disc recorder. According to this non-contact coupling, a brush (which wears out) is not used and the surface of the slip ring does not become dirty, so that the maintenance of the input/output circuit is easy and the input/output circuit has a long lifetime.

FIG. 21 shows another embodiment of the input/output circuit employing a rotary transformer which utilizes electromagnetic induction coupling instead of a slip ring. In FIG. 21, two rotors 161 and 162 are coupled to the head drum 100 so as to rotate together with the head drum 100. Each of these rotors 161 and 162 has four protruding poles corresponding to every other head in head drum 100. The protruding pole of one rotor is determined to be in the middle of the gap portion between two protruding poles of the other rotor. The center angles of the protruding pole and the gap portion are preferably mode $\pi/4$, rodions, respectively. Secondary windings are wound around the respective protruding poles of the rotor 161 and 162. Head windings of the rotary heads H1-H8 are connected to the secondary windings of the two rotors 161 and 162 alternately in the direction of rotation. Stators 163 and 164 in the shape of circular arcs are fixed so that they are always opposite either one of the protruding poles of the rotors 161 and 162, respectively. These stators 163 and 164 are formed by ferro-cores in the shape of circular arcs having a center angle $\pi/2$ radians. Primary windings are wound around the stators. The primary windings are connected to the input/output circuit shown in FIG. 14 through the contacts of relay 110. The mounting angles of the stators 163 and 164 relative to the head drum 100 are selected in such a way that, when one head contacts the middle position of the magnetic tape 103 in its width direction, the protruding pole of the rotor connected to this head is positioned in the middle portiion of the circular arc of the stator opposite the protruding pole.

FIG. 22 shows the relationship between the coupling factors between the rotor and the stator of the rotary transformer and the rotating angles. As is clear from FIG. 22, the coupling factor has a maximum value in the interval of the rotating angle of about $\ominus_1$ in which one head contacts the magnetic tape. Before and after that period, the coupling factor decreases. Since the switcher 130 selects the outputs from the heads sequentially only during the period in which the stator and one protruding pole of the rotor couple together (the flat maximum portion in FIG. 22), the undesired output such as the output from the head not contacting the magnetic tape or noise is not mixed.

As embodiment of one set of rotor and stator of the rotary transformer shown in FIG. 21 is shown in FIGS. 23 and 24. In FIGS. 23 and 24, a secondary winding 172 is wounded around each protruding pole 171 of a rotor 170. A disc yoke 173 is applied to both sides of the rotor 170 so as to form a recess for containing the winding 172 between the protruding pole 171 and the disc yoke 173. Similarly, a stator ferrocore 174 has a projecting portion 175 opposite to the protruding pole 171. A primary winding 176 is wounded around the projecting portion 175. A yoke 177 having the same arc shape as the ferrocore 174 is applied to both sides of the ferrocore 174 so as to form a recess for containing the winding 176. As a result, the rotor 170 is always coupled to the stator 174 so s to form a short distance closed magnetic loop, in order to improve the coupling efficiency.

The above input/output circuit according to this invention has the following advantages.

(1) Even though there are eight rotary heads, according to this invention, it is sufficient to provide only two slip rings, two recording amplifiers, two reproducing preamplifiers and two equalizers (in the case of FIG. 19, one equalizer is sufficient), so that it is possible to make the whole apparatus compact with light weight and low power consumption.

(21) In the recording mode, the recording current flows through only the head which is in contact with the magnetic tape or which is near the contacting area, so that the recording current can be advantageously utilized without waste and therefore power consumption can been reduced.

(3) A continuous reproducing output can be obtained from the switcher without being influenced by the gap of the dividing point of the slip ring and without regard to the scanning system (such as transverse scanning or helical scanning) and to the recording pattern on the magnetic tape.

(4) The gap of the dividing point has a large degree of angular freedom, i.e. $\pm 17.5°$, so that the position of each dividing point and the gap may to be mismatched within the above angle of $\pm 17.5°$. This is advantageous in obtaining an accurately working machine. Further, it is possible to make the outer diameter of the slip ring compact while retaining accuracy.

(5) The amount of recording current and the amount of equalization can be adjusted in accordance with the characteristic of each head by the gain switchers 111 and 112.

An embodiment of the control track recording/reproducing amplifier according to the invention is shown in FIG. 25. In FIG. 25, reference numrals 180, 181, 182 and 183 denote monostable multivibrators, reference numerals 184 and 185 denote wave shapers, reference numeral 186 denotes an amplifier, reference numeral 187 denotes a changing switch, and a reference numeral 188 denotes a control signal recording/reproducing head. The input e (FIG. 26B) is a ref frm pulse of 30 Hz formed from the vertical synchronizing signal. The input c (FIG. 26A) is a drum tach pulse from the drum tachometer pulse generator 104 in FIG. 14. According to the present invention, the frequency of the drum tach pulse c is higher than the 240 Hz of the usual conventional VTR, and is 1.92 KHz in this embodiment. There, the period of the drum tach pulse c is $T_1$. The pulse c is applied to the monostable multivibrator 180 so as to produce a trigger pulse k which has a short delay with respect to the pulse c. This trigger pulse k drives a monostable multivibrator 181. The monostable multivibrator 181 has a reset terminal. A positive pulse m having a pulse width of $T_1/2$ (FIG. 26E) is produced by the trigger pulse K when the reset input l (FIG. 26D) is at a high level. The monostable multivibrator 182 is triggered by the ref frm pulse e and produces a negative pulse l (FIG. 26D) having a pulse width of about $3T_1/4$. This negative pulse l is applied to the reset terminal of the monostable multivibrator 181. The delay time of the monostable multivibrator 180 is determined in such a way that one pulse following the pulse e in the trigger pulse k is positioned in the period of the pulse l. Thus, a symmetric rectangular wave m is obtained from the output terminal of the monostable multivibrator 181. In this wave m, one pulse corresponding to the pulse e is removed. The symmetric rectangular wave m is applied to the wave shaper 184, from which a recording current n (FIG. 26F) is obtained. The wave shaper 184 may be composed of a resonant circuit, a low pass filter or an integral circuit in which the Q value is so small as not to produce a harmful transient phenomeon in the portion in which one cycle is removed. If the frequency of the control signal is sufficiently high, higher harmonics of the recording current above the maximum recording frequency are eliminated, so that the recording current n is not required to be a sine wave and a recording current in the form of a triangular or rectangular wave may be utilized. In this case, the wave shaper 184 may be composed of a simple intergrated circuit, or the wave shaper 184 may be omitted. Since the wave shaper 184 is used only in the recording mode, a band pass filter may be employed without influencing the characteristics of the servo loop in the reproducing mode.

In the reproducing mode, the voltage f from a head 188 is amplified by an amplifier 186, from which a reproduced voltage p (FIG. 26G) is obtained. In the wave form shaper 185, a rectangular wave pulse g (FIG. 26H) corresponding to the pulse m (FIG. 26E) is formed from the reproduced voltage p. This pulse g is used as the control track signal g. The servo loop in the reproducing mode is composed in such a way that the phases of the leading or trailing edges of the pulse c and the reproduced control signal pulse g are compared to produce an error signal which controls the tape travelling speed so as to maintain a constant phase relationship between the pulses g and c. In order to compare the phases of the pulses c and g, it is usual to take a step in which a saw tooth wave (or a trapezoid formed by slicing the upper and bottom ends of the saw tooth wave) produced by one of these pulses c and g is sampled by the other pulse and then the sampled level is held. In this case, if the pulse c is used for producing the saw tooth wave and the pulse g is used for producing a sampling pulse, the sampling pulse train in which one sample pulse is omitted has only a minimal influence upon the wave form of the error signal, since the sampled value just before the omitted sample pulse has been held. Accordingly, when the frequency of the pulse g is high, it is not necessary to consider the influence of the omission of one pulse from the pulse g in every frame period upon phase comparison.

Next, the reproduction of the frame signal will be explained. The monostable multivibrator 183 is retriggerable. That is to say, as shown by the dashed line in FIG. 26I, the monostable multivibrator 183 will be retriggered to extend the negative going pulse when the following trigger pulse is applied in the period of a negative going pulse having a pulse width of $T_2$ of the multivibrator 183. This negative going pulse will be terminated after the period of $T_2$ after the application of the latest trigger pulse. In this embodiment, the monostable multivibrator 183 produces a negative going pulse having a period $T_2$ after the monostable multivibrator 183 is triggered by the positive end or the leading edge of the reproduced control signal g. If the period $T_2$ is slightly longer than the period $T_1$, the monostable multivibrator 183 continues to produce a negative going pulse during the occurrence of the pulses g, and resets after the period $T_2$ of the last pulse g which has occurred just before the period of the omission of the pulse g. The monostable multivibrator 183 produces a negative going pulse again by the following pulse g after the period of said omission. This circuit means can reproduce the frame pulse h and can perform a phase comparison of the frame pulse h with the pulse e related to the synchronizing signal.

An embodiment of the control track recording and reproducing amplifier shown in FIG. 25 will be explained with referring to FIG. 27. In FIG. 27, the monostable multivibrators 180-184 may be composed of integrated circuit of the Signetics type NE 555 V. In this monostable multivibrator, pin numbers 1, 2, 3, 4, 5, 6, 7 and 8 are a ground terminal, a trigger input (negative going pulse) terminal, an output (positive going pulse) terminal, a reset terminal, a control voltage input terminal, a time constant circuit connecting terminal, a time constant circuit connecting terminal and a power (+5 V) input terminal, respectively. A time constant circuit R, C determines the pulse width of the output, a circuit r, c is a differentiating circuit for producing a trigger pulse which has a pulse width sufficiently narrow compared with the repetition period. Q11 and Q12 are external NPN and PNP transistors, respectively. The transistor Q11 forms the wave shaper 184 and the transistor Q12 controls the discharge of the capacitor C in the monostable multivibrator 183. The amplifier 186 may be composed of cascade connection of the two Texas Instrument integrated circuits SN 72747. The wave shaper 185 may be composed of Texas Instrument integrated circuit SN 72820. Reference numerals 189 and 190 denote conventional inverters.

Further, the control track recording/reproducing amplifier according to this invention is not limited to the above embodiment. For example, instead of removing one cycle corresponding to the position of the frame signal in the high frequency sine wave signal as the control signal, it is possible to remove two or more than two cycles. In such a case, the above high frequency sine wave signal information is held during the period of the omission cycle by the sample hold means in the servo loop in the reproducing mode.

The above mentioned control track recording/reproducing amplifier according to this invention has the following advantages in the case when the control signal is recorded or reproduced.

(1) When the frame signal is mixed, the increase of the recording frequency band width is less than the prior art method, so that the band width can be used advantageously. That is to say, the frequency of the control signal can be increased up to the maximum frequency in which the recording can be realized. This improves the characteristic of the sample hold circuit, and therefore high accuracy tracking can be realized.

(2) The mixing of the frame signal with the control signal, i.e. the omission of n pulses in the control signal every frame period scarcely influences the loop characteristics, due to the characteristics of the sample hold in the servo loop in the reproducing mode.

(3) The frame signal can be reproduced by an extremely simple circuit. In addition, a filter which would have an adverse influence upon the loop characteristics is not used in the above circuit, so that the frequency band of the control signal can be increased so as to realize a high speed response.

(4) The portion of the magnetic tape on which the frame pulse is recorded by omitting the frame pulse can be clearly distinguished by the eye after the tape is processed by a conventional developing system utilizing iron powder or the like, so that this portion can be used as a guide for slicing and editing the recorded tape.

Further, in a magnetic video tape recording and reproducing apparatus according to the invention, the track on which the control signal is recorded is located away from both of the side end portions of the tape, and the control signal is recorded on a control track in the center portion in the direction of the tape width (preferably on or around the center line of the tape in general). As shown in FIGS. 28-30, a control head 201 is arranged in a position just before a video head drum 203 in the travelling direction of the magnetic tape 202 (shown by an arrow in FIGS. 28 and 30) and at or around the tape center in the direction of the tape width which corresponds to the position of the control track. For example, the control head 201 is buried in the end portion (an air bearing portion) of a drum motor 204 which is opposite the video head drum 203. A pad 206 composed of a piece of felt, a spring or the like may be buried in the portion of a tape guide 205 opposite the video head drum 203 which corresponds to the control head 201 so as to stabilize the contact between the magnetic tape 202 and the control head 201. Eight video heads 207 are mounted on the video head drum 203.

Alternatively, in another embodiment shown in FIG. 31, the control head 201 and an audio head 208 may be arranged at or around the center position in the tape width direction of the magnetic tape 202 and in addition they are to be positioned approximately on a line perpendicular to the direction of the tape travel.

In the recording mode, after the control signal has been recorded at the center portion of the magnetic tape 202, the video signal is recorded on the magnetic tape 202 in the direction substantially perpendicular to the direction of tape travel by the eight video heads 207 mounted on the video head drum 203 in turn.

According to the present invention, the control signal is recorded on the control track by superimposing it on the video signal to be recorded on the video track, but the azimuths of both of the heads 201 and 207 are perpendicular to each other and the recording depths of these two signals are different because the recording wave length of these signals are different, so that the mutual influence resulted from the multi recording of these two signals is scarcely recognized. In other words, the control signal is recorded down to the deep portion of the magnetic layer because the length of the recording wave of the control signal is longer than that of the video signal, whereas the video signal is recorded down to about 1 μm under the surface of the magnetic layer because the length of the recording wave of the video signal is shorter than that of the control signal and the control signal recorded in the deeper portion of the magnetic layer is not substantially erased by the video signal and is left as it is. As a result, the video signal is recorded on the video track after the recording of the control signal on the control track, and the recording depth is not deep. In addition, the video signal is an FM signal, so that the influence of the control signal upon the video signal is not recognized at all. Relating to the control signal, the surface portion of the magnetic layer is erased when the video signal is recorded on the video track, but the deep portion in the magnetic layer is not influenced by that erasing action, so that the level down of the control signal due to the erasing is very small.

In an experiment in which the tape travelling speed was 19.05 cm/s and the frequency of the control signal was 1.92 KHz, the level down of the control signal influenced by the video heads was about 15%.

In order to prevent level variation of the control signal on the video track portion (in which the control signal is partly erased) and on the guard band portion (in which the control signal is not erased), it is most advantageous to cause the pitch of the video track on the magnetic tape 202 to coincide with the recording wave length of the control signal. As described in the foregoing, the control signal is formed by the drum tach pulse from the drum tachometer pulse generator 104 (FIG. 14) rotating with the video head drum 203. Here, if the number of drum tach pulses produced by the drum tachometer pulse generator 104 (FIG. 14) during one rotation of the video head drum 203 is made equal to the number of heads 207 (eight) on the video head drum 203, the above purpose of preventing level variation of the control signal will be satisfied. For example, in the case of the eight-head drum with a rotating speed of 240 rps, the frequency of the control signal is 1.92 KHz. When the above conditions are not satisfied, the gap of the control head 201 may be so inclined as to exactly cover one set (or a plurality of sets) of a video track and a guard band in such a way that the upper and the lower parts of the amplitude modulation are reproduced simultaneously so as to obtain an average output.

Further, in the above experiment, the variation of reproducing a level of the control signal due to such a variation as that of contact between the magnetic tape 202 and the head 201 is less than 10%; that is, it is very small.

Figure 32:
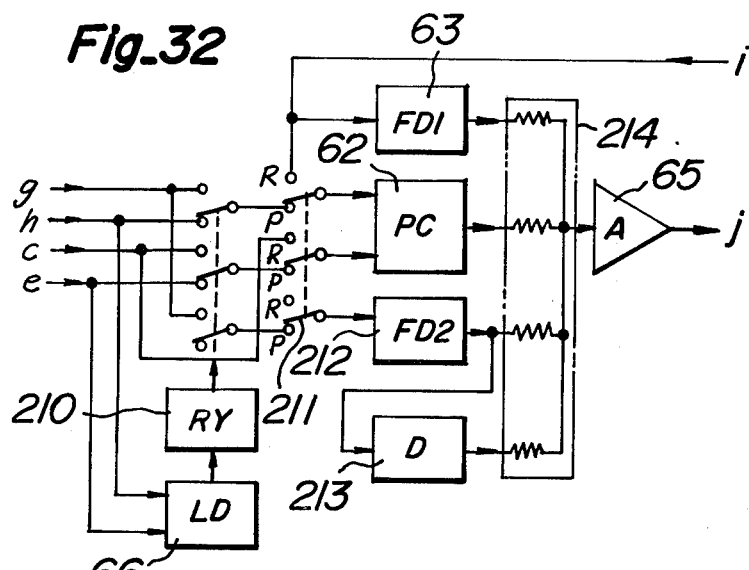
FIG. 32 is a block diagram of an embodiment of the capstan servo circuit of an eight-head video tape recording and reproducing apparatus according to the invention.

FIG. 32 shows an embodiment of the capstan servo circuit according to the present invention. In FIG. 32, parts corresponding to the similar parts in the conventional circuit shown in FIG. 8 have the same reference numerals. In FIG. 32, a reproducing mode changing relay 210 controlled by the output of the phase lock detection circuit 66 is similar to the relay 67 in FIG. 8 but has three contact pairs. The signals g and c are applied to the input sides of the first, second and third contact pairs. The output from the third contact pair is applied to a second frequency discriminator 212 through a recording/reproducing changing switch 211. The output of the discriminator 212 is applied to a differentiator 213 and an adder 214 in the form of resistor coupling. The outputs from the differentiator 213, the phase comparator 62 and the first frequency discriminator 63 are applied to the adder 214. The adder 214 corresponds to the adder 64 in FIG. 8 and the output from the adder 214 is applied to the amplifier 65, from which the capstan motor driving signal j is obtained.

Embodiments of phase comparators 62 and 66 and frequency discriminators 63 and 212 will be described in the following.

Figure 33:
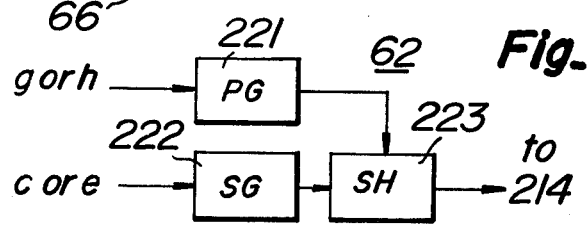
FIG. 33 is a block diagram of one embodiment of the phase comparator in the capstan servo circuit of FIG. 32.

FIG. 33 shows an embodiment of the phase comparator 62. In FIG. 33, a reference numeral 221 denotes a sampling pulse generator for producing a sample pulse in response to the control track signals g or h. A reference numeral 222 denotes a signal generator for producing a gradient wave, for example, a sawtooth wave or a trapezoid wave formed by slicing the upper and lower ends of the sawtooth wave, with respect to the reference signals c or e. A reference numeral 223 denotes a sample hold circuit for sampling the sawtooth or trapezoid wave by means of the sample pulse received from the sample pulse generator 221 and for holding the sampled value. The sample hold circuit 223 produces a d.c. voltage proportional to the phase difference between the signals g and c or the signals h and e.

Figure 34:
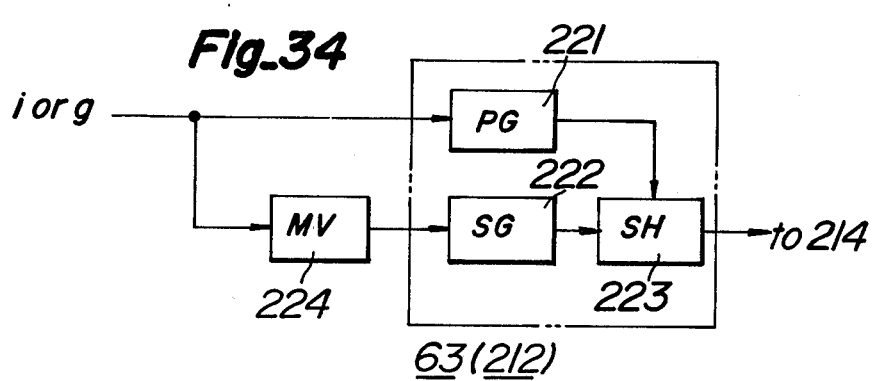
FIG. 34 is a block diagram of one embodiment of the frequency discriminator of the capstan servo circuit of FIG. 32.

FIG. 34 shows an embodiment of the frequency discriminator 63 or 212. In FIG. 34, a block enclosed by a dashed line is a phase comparator which has the same arrangement as the phase comparator 62 shown in FIG. 33. In FIG. 34, a reference numeral 224 denotes a monostable multivibrator, the delay time of which is determined to be equal to one average period of the input pulse i or g.

Figure 35:
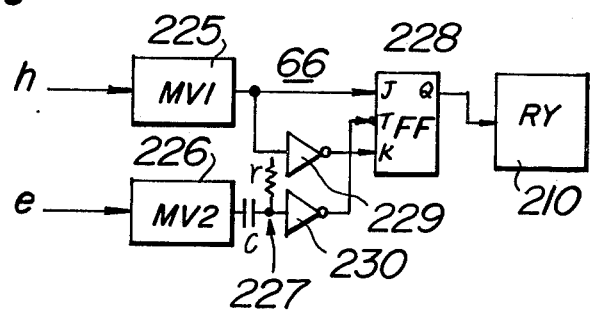
FIG. 35 is a block diagram of one embodiment of the phase lock detector of the capstan servo circuit of FIG. 32.

FIG. 35 shows an embodiment of the phase lock detection circuit 66. In FIG. 35, a reference numeral 225 denotes a monostable multivibrator for producing a positive going pulse for determining a range of phase lock detection, and a reference numeral 226 denotes a monostable multivibrator for producing a positive going pulse the trailing edge of which is located at the center of the positive going pulse obtained from the monostable multivibrator 225 in a phase lock condition. A reference numeral 227 denotes a an rc differentiating circuit for obtaining the trailing edge pulse of the negative going pulse from the monostable multivibrator 226. A reference numeral 228 denotes a JK flip-flop, to the J input terminal of which the output from the monostable multivibrator 225 is applied, to the K input terminal of which the output from the monostable multivibrator 225 is applied through an inverter 229, and to the trigger input terminal T of which the output from the differentiating circuit 227 is applied through an inverter 230. The Q output from the flip-flop 228 is applied to the electronic relay 210 which is enabled when the input thereof is high level. When the input pulses h and e are not in a phase lock condition and the trailing edge pulse of the monostable multivibrator 226 is out of the positive going pulse of the monostable multivibrator 225, the J input is at a low level and the K input is at a high level at the instant of the application of the trailing edge pulse to the trigger input terminal T of the flip-flop 228, so that the Q output of the flip-flop 228 is held at its low level, and then the electronic relay 210 is disabled, so that the relay contacts of the relay 210 shown in FIG. 32 are connected to the down positions or the normally closed contacts. In the meantime, when the input pulses h and e are in a phase lock condition and the trailing edge pulse of the monostable multivibrator 226 is positioned within the positive going pulse of the monostable multivibrator 225, the J input switches to the high level and the K input switches to the low level at the instant of the application of the trailing edge pulse to the trigger input terminal T of the flip-flop 228, so that the Q output switches to a high level and then the relay 210 is enabled to connect the relay contacts to the upper normally open contacts.

Turning now to FIG. 32, in the recording mode, the recording/reproducing change switch 211 is connected to the R (recording) position, and the cap tach pulse i from the capstan tachometer pulse generator 6 rotating with the capstan and the drum tach pulse c from the drum tachometer pulse generator 16 (either of these pulses i and c has a frequency 1.92 KHz) are applied to the phase comparator 62 so as to produce a d.c. voltage proportional to the phase difference between these pulses i and c. On the other hand, the cap tach pulse i is applied to the first frequency discriminator 63 so as to obtain a d.c. voltage proportional to the rotation of the capstan. These outputs from the phase comparator 62 and the frequency discriminator 63 are added by the adder 214, the output of which is amplified by the amplifier 65. The output j from the amplifier 65 is used to control the rotation of the capstan motor 7. According to this invention, the integral and local proportional loop is composed in this way so as to rotate the capstan in synchronism with the video head drum 203. At the same time, the control track recording/reproducing amplifier shown in FIG. 25 mixes the drum tach pulse c with the ref frm pulse e so as to form the control track signal f which corresponds to the signal n shown in FIG. 26F. The control track signal f is recorded on the control track located substantially at the center of the magnetic tape 202 in the direction of tape width.

In the reproducing mode, the change switch 211 is connected to the P (playback or reproducing) position. Switch 211 is connected to the electronic relay 210, to which the ct signal g reproduced from the control track by the control track recording/reproducing amplifier shown in FIG. 25 (as described above and having a frequency of 1.92 KHz) and the ct frm pulse h having a frequency of 30 Hz, are applied. At first, the relay 210 is connected to the down normally closed positions as shown in FIG. 32, and in these positions the ct frm pulse h and the ref frm pulse e are applied to the phase comparator 62 so as to compare the phases of these pulses h and e in the 30 Hz mode. The output from the phase comparator 62 is added to the output from the first frequency discriminator 63 so as to control the rotation of the capstan motor through the integral and local proportional loop. When the phase lock detector 66 detects that the phase difference between these two outputs is within a given threshold, the relay 210 is enabled to change the contacts to the upper position. In this condition, the ct signal g and the drum tach pulse c are applied to the phase comparator 62 so as to compare the phases of these signals g and c in the 1.92 KHz mode. The ct signal g is also applied to the second frequency discriminator 212, the output signal of which is further applied to the differential circuit 213. The differential output from the differential circuit 213, the output from the phase comparator 62 and the outputs from the first and the second frequency discriminators 63 and 212 are added by the adder 214, the output of which is amplified by the amplifier 65. The output from the amplifier 65 controls the rotation of the capstan motor. According to this invention, respective control loops, i.e. the integral, the local proportional, the proportional and the differential control loops are arranged in this way. The functions of the respective control loops will be explained in the following.

The local proportional control loop, same as the tachogenerator feed back in the various conventional servo systems, suppresses the influences of the variation of the rotation which occur in the motor itself and of the variation of the load torque applied to the motor, improves the non-linearity of the characteristic of the input voltage vs. rotating speed and decreases the time constant of the motor equivalently, so that this local proportional control enhances the quick response of the control loop.

The integral control loop is the basis of the servo system of this kind and performs tracking of the video signal by coinciding the phase of the control signal h or g with that of the reference frame signal or the head drum tachometer signal e or c. In order to suppress the respective frequency components of tape travelling jitter over a wide frequency band, it is necessary to increase the gain of the integral control loop. In general, however, the more the integral gain increases, the more unstable the integral control system becomes, and if the integral gain exceeds the critical gain of stable control, oscillation occurs in the servo system.

The proportional control loop has an advantage of improving phae rotation of the ingetral loop characteristics in the high frequency region, so that the integral gain can be increased stably by adding the proportional control. The critical gain of stable control in the integral control loop can be increased in accordance with the increase of the proportional gain until the proportional control loop oscillates. This oscillation can also be suppressed by adding the differential control loop.

As clear from the above, at least in a continuous control system, an integral gain can be increased by adding a higher order differential control, and thus each frequency of travelling jitter can be suppressed throughout a wide frequency band. Even in the case of a sampling control system, a similar advantageous effect can be expected if the sampling frequency is sufficiently high.

According to the invention, the control track is located approximately at the center of the magnetic tape, so that the influence of tape stretch can be reduced, and in addition the azimuth variation of the control track due to the variation of stretch depending upon portions of the magnetic tape and the variation of the relative phase of the control signal on the control track to the video track can be greatly reduced. It is sufficient to hold or press the magnetic tape lightly by a pad. Therefore, this light pressing can scarcely affect the tape travelling condition, and variation of the control signal level can be prevented. As a result, according to this invention, a stable and highly accurate control signal can be obtained even in the case of short wave length recording.

Further, in the prior art apparatus in which the control head is arranged to be away from the audio signal in the direction of tape travelling, wow and flutter in the recording mode can hardly be corrected by a servo system in the reproducing mode. On the other hand, according to this invention, the control head and the audio head are arranged adjacent to each other in the direction perpendicular to the tape travelling direction, and not only the control signal but also the audio signal are multi-recorded together with the video signal, so that audio wow and flutter due to variation of tape travel in the recording mode can be removed by the servo system in the reproducing mode. Thus, the servo system in the recording mode may be omitted in a portable and compact VTR. This is useful for making the whole apparatus more compact and lighter.

Further, according to this invention, the frequency of the control signal for controlling the tape travel is sufficiently high, so that the loop characteristic of the control circuit is scarcely deteriorated by sampling, so that the differential and proportional gain can be made sufficiently large. Accordingly, the integral gain can be increased by improving the characteristic of the integral loop and tape travelling jitter can be sufficiently reduced. Therefore, even if a magnetic tape which is thinner than the usual tape travels with low speed, and the distance between video tracks is made narrower than the conventional track distance, the possibility of getting out of tracking can be pevented and a high density recording can be realized in which a longer time recording and reproducing compared with the conventional VTR can be afforded in the case of the same amount of magnetic tape (volume of the wound magnetic tape).

What is claimed is:

1. A eight head magnetic video tape recording and reproducing apparatus for recording a video signal on a plurality of tracks on a magnetic tape in a direction substantially perpendicular to the travelling direction of said magnetic tape and for reproducing video signals therefrom, comprising
    a single rotary head drum having eight magnetic video heads mounted on a circumferential surface of said head drum and arranged equidistantly from each other so that two of said eight heads touch simultaneously at least opposite ends of each of said video tracks on said magnetic tape, and
    first and second rotary signal transformer means having substantially the same configuration and substantially the same size for respectively transferring video signals to and from respective video head groups substantially under the same transferring condition, each of which groups comprises every other one of said eight magnetic video heads, each of said rotary signal transformer means having a rotary part which rotates together with said rotary head drum and which has four rotary windings connected respectively to said every other one of said eight magnetic video heads and a fixed part which has a fixed winding for coupling successively to said four rotary windings by means of being opposed successively to each other in a radial direction of rotation, said rotary windings being wound respectively in succession around eight protruding poles which are arranged equidistantly from an axis of rotation and every four of which are arranged equidistantly from each other respectively on a rotor rotating together with said rotary head drum, said fixed windings being wound respectively around protruding poles which are arranged on a stator equidistantly from the axis of rotation and to which respective ones of said protruding poles of said rotor are opposed successively when said rotor rotates.

2. An eight head magnetic video tape recording and reproducing apparatus as claimed in claim 1, further comprising
    a recording/reproducing switch,
    first and second recording amplifiers for receiving and amplifying a modulated video signal, the outputs of said first and second recording amplifiers being coupled by said recording/reproducing switch to the fixed parts of said first and second signal coupling means respectively,
    first and second reproducing amplifiers for receiving and amplifying reproduced modulated video signal from said video tape, said video signal being coupled to said first and second reproducing amplifiers through the fixed parts of said first and second coupling means and said receiving/reproducing switch, and
    switching means for switching alternately output signals derived respectively from said first and second reproducing amplifiers.

3. An eight head magnetic video tape recording and reproducing apparatus as claimed in claim 2, further comprising
    a drum tachometer pulse generator for producing a predetermined number of pulses during each revoltuion of said video head drum, said pulses comprising a drum tachometer pulse signal,
    multiplexing means for multiplexing said drum tachometer pulse signal with a reference frame signal related to the vertical synchronizing component of said modulated video signal, said multiplexing means eliminating at least one cycle pulse of said high frequency signal which occurs simultaneously with said reference frame signal thereby generating a control signal,
    control signal means for coupling said control signal from said multiplexing means on to said magnetic tape in the recording mode and reproducing said control signal from said tape in the reproducing mode,
    first reproducing means coupled to said control signal means for obtaining a reproduced high frequency signal from an output signal reproduced from said magnetic tape in the reproducing mode wherein at least one cycle pulse of said high frequency signal is omitted, and
    second reproducing means coupled to said first reproducing means for generating a control track frame signal by detecting the time interval in which said at least one cycle pulse is omitted from said reproduced high frequency signal.

4. An eight head magnetic video tape recording and reproducing apparatus as claimed in claim 3, further comprising
    first and second equalizers interposed between said reproducing amplifiers and said switching means,
    a gate pulse generator for producing pulses for controlling said switching means in response to said drum tachometer pulse signals and further producing gate pulses occurring at intervals related to the rotation of said magnetic video heads,
    a first gain control circuit for setting the respective gains of said two recording amplifiers successively at respective values predetermined in accordance with the characteristics of the respective magnetic video heads under the control of said gate pulses, and
    a second gain control circuit for setting the respective gains of said two equalizers successively at respective values predetermined in accordance with the characteristics of the respective magnetic video heads under the control of said gate pulses.

5. An eight head magnetic video tape recording and reproducing apparatus as claimed in claim 3, wherein said switching means is coupled directly to the outputs of said reproducing amplifiers; and which further comprises a gate pulse generator for producing pulses for controlling said switching means in response to said drum tachometer pulse signal and further producing first and second groups of gate pulses occurring at intervals related to the rotation of said magnetic video heads, an equalizing means coupled to the output of said switching means, a first gain control circuit driven by said second group of gate pulses derived from said gate pulse generator, the gain of said equalizing means being set successively at respective values predetermined in accordance with the characteristics of the respective magnetic video heads under the control of said third gain control circuit, and a second gain control circuit for setting the respective gains of said two recording amplifiers successively at respective values predetermined in accordance with the characteristics of the respective magnetic video heads under the control of said first group of gate pulses from said gate pulse generator.

6. An eight head magnetic video tape recording and reproducing apparatus as claimed in claim 3, wherein; said multiplexing means consists of a first monostable multivibrator for delaying said drum tachometer pulse signal, a second monostable multivibrator receiving said reference frame signal for producing an output pulse having a predetermined pulse width, and a third monostable multivibrator triggered by an output signal from said first monostable multivibrator and reset during the occurrence of the output pulse from said second monostable multivibrator, said third monostable multivibrator producing high frequency output pulses having a predetermined pulse width, said high frequency output pulses not being produced during the period of said at least one cycle of the high frequency signal corresponding to the occurrence of said reference frame signal and further said second reproducing means consists of a fourth monostable multivibrator.

7. An eight head magnetic video tape recording and reproducing apparatus as claimed in claim 3, further comprising a magnetic control head arranged at a position just ahead of said single rotary head drum with respect to the travelling direction of said magnetic tape for recording said control signal on a control track in said recording mode and for reproducing said control signal from said control track in said reproducing mode, said control track being arranged on the magnetic tape parallel to the longitudinal axis of said magnetic tape and at a position other than both of the side edge portions of said magnetic tape.

8. An eight head magnetic video tape recording and reproducing apparatus as claimed in claim 7, wherein said magnetic control head is arranged in such a way that said control track is disposed substantially at the center of said magnetic tape in the tape width direction thereof.

9. An eight head magnetic video tape recording and reproducing apparatus as claimed in claim 8, further comprising an audio head arranged adjacent to said control head in the direction substantially perpendicular to the travelling direction of said magnetic tape.

10. An eight head magnetic video tape recording and reproducing apparatus as claimed in claim 7, further comprising a capstan motor, a capstan tachometer pulse generator coupled to said capstan motor, a first frequency discriminator for detecting a capstan tachometer pulse derived from said capstan tachometer pulse generator, a phase comparator for comparing the phases of said reproduced high frequency signal and said drum tachometer pulse, a second frequency discriminator for detecting said reproduced high frequency signal, a differentiator for differentiating the output signal from said second frequency discriminator, an adder for adding output signals from said first and second frequency discriminators, said phase comparator and said differentiator, the output of said adder being coupled to the input of said capstan motor.

11. An eight head magnetic video tape recording and reproducing apparatus as claimed in claim 10, further comprising a phase lock detecting circuit for producing a phase lock detecting output signal in response to the coincidence of phases between said control track frame signal from said second reproducing means and said reference frame signal, a relay controlled by said phase lock detecting output in said reproducing mode for applying said control track frame signal and said reference frame signal to said phase comparator when said phase lock detecting output signal is not produced, said relay further applying said high frequency signal reproduced from said control track and said drum tachometer pulse signal to said phase comparator and said high frequency signal to said second frequency discriminator when said pulse lock detecting output signal is produced, and means for applying said capstan tachometer pulse and said drum tachometer pulse signal to said phase comparator in said recording mode.

12. An eight head magnetic video tape recording and reproducing apparatus as claimed in claim 11, wherein; said phase comparator consists of a first sampling pulse generator receiving either one of said control track frame signal and said high frequency signal for producing a first sampling pulse, a first signal generator receiving either one of said reference frame signal and said drum tachometer pulse signal for producing a first ramp wave signal, and a first sample-holding circuit for sampling said first ramp wave signal by said first sampling pulse and for holding a signal level of the thus sampled ramp wave signal;

said first and second frequency discriminators consist respectively of a first monostable multivibrator receiving either one of said capstan tachometer pulse and said high frequency signal for delaying the received signal, a second sampling pulse generator receiving either one of said capstan tachometer pulse and said high frequency signal for producing a second sampling pulse, a second signal generator receiving an output signal from said first monostable multivibrator for producing a second ramp wave signal, and a second sample-holding circuit for sampling said second ramp wave signal by said second sampling pulse and for holding a signal level of the thus sampled ramp wave signal; and said phase lock detecting circuit consists of a second monostable multivibrator triggered by said control track frame signal, a third monostable multivibrator triggered by said reference frame signal, and a J–K flip-flop having a first input terminal receiving an output signal from said second monostable multivibrator, a trigger input terminal receiving the signal from said third monostable multivibrator through a differentiating circuit and a first inverter, a second input terminal receiving the output signal from said second monostable multivibrator through a second inverter, and an output terminal from which said phase lock detecting output signal is obtained.

* * * * *